United States Patent

Lenihan

[15] 3,701,091

[45] Oct. 24, 1972

[54] PROCESS OF FORMING TIME-VARIANT FILTERS FOR FILTERING SEISMIC DATA

[72] Inventor: Jeremiah P. Lenihan, Carrollton, Tex.

[73] Assignee: Mobil Oil Corporation

[22] Filed: Feb. 19, 1971

[21] Appl. No.: 116,788

[52] U.S. Cl. ...340/15.5 AF, 340/15.5 DP, 324/77 R, 444/1
[51] Int. Cl. .............................................G01r 1/28
[58] Field of Search ...340/15.5 DP, 15.5 AF, 15.5 F; 324/77 R; 444/1

[56] References Cited

UNITED STATES PATENTS

| | | | |
|---|---|---|---|
| 3,281,776 | 10/1966 | Ruehle | 340/15.5 AF |
| 3,393,402 | 7/1968 | Bemrose | 340/15.5 F |
| 3,396,365 | 8/1968 | Kerns | 340/15.5 F |
| 3,581,274 | 5/1971 | Ruehle | 340/15.5 AF |

*Primary Examiner*—Benjamin A. Borchelt
*Assistant Examiner*—H. A. Birmiel
*Attorney*—William J. Scherback and Frederick E. Dumoulin

[57] ABSTRACT

The specification discloses a process of forming a set of time-variant filters from an input set of filters having predetermined start times. The center frequency and envelope frequency of the input filters are determined and filters are interpolated between adjacent input filters, based upon the difference in center frequency between the adjacent input filters. In the embodiment disclosed, the number of filters interpolated between adjacent input filters is equal to the number of integer frequency changes between adjacent input filters minus one. The envelope frequencies of the interpolated filters are determined by a linear interpolation between the envelope frequencies of adjacent input filters and the interpolated filters are placed at equally spaced time intervals between adjacent input filters. The length of the input filters and interpolated filters are determined as inversely proportional to their envelope frequencies. The time responses of the filters are determined and truncated with a special truncator.

9 Claims, 24 Drawing Figures

Fig. 4

INPUT FILTERS AND TIMES

| TIME | F1 | F2 | F3 | F4 |
|---|---|---|---|---|
| 800 | 15 | 15 | 60 | 60 |
| 400 | 0 | 0 | 45 | 45 |
| 1800 | 0 | 0 | 45 | 45 |
| 2000 | 0 | 0 | 30 | 30 |
| 2500 | 6 | 6 | 22 | 22 |
| 3400 | 12 | 12 | 35 | 35 |
| - | 0 | 0 | 0 | 0 |
| - | -1 | -1 | -1 | -1 |
| - | 0 | 0 | 0 | 0 |

| TIME | I | IDF | F4 |
|---|---|---|---|
| 800 | 1 | 23 | |
| 860 | 2 | 23 | |
| 920 | 3 | 23 | |
| 980 | 4 | 25 | |
| 1040 | 5 | 25 | |
| 1100 | 6 | 25 | |
| 1160 | 7 | 27 | |
| 1220 | 8 | 27 | |
| 1280 | 9 | 27 | |
| 1340 | 10 | 29 | |
| 1400 | 11 | 29 | |
| 1800 | 12 | 31 | |
| 1825 | 13 | 33 | |
| 1850 | 14 | 35 | |
| 1875 | 15 | 37 | |
| 1900 | 16 | 39 | |
| 1925 | 17 | 41 | |
| 1950 | 18 | 43 | |
| 1975 | 19 | 45 | |
| 2000 | 20 | 47 | |
| 2083 | 21 | 49 | |
| 2167 | 22 | 51 | |
| 2250 | 23 | 53 | |
| 2333 | 24 | 55 | |
| 2417 | 25 | 57 | |
| 2500 | 26 | 59 | |
| 2650 | 27 | 61 | |
| 2800 | 28 | 63 | |
| 2950 | 29 | 65 | |
| 3100 | 30 | 63 | |
| 3250 | 31 | 61 | |
| 3400 | 32 | 55 | |
| 3550 | 33 | 53 | |
| 3700 | 34 | 51 | |
| 3850 | 35 | 49 | |
| 4000 | 36 | 43 | |

THE POWER CONSTANT IS .80524
THE AVERAGE NUMBER OF FILTER POINTS IS 41

INTERPOLATED FILTER SET

| FZ | FC | F1 | F2 | F3 | F4 | POWER | AREA |
|---|---|---|---|---|---|---|---|
| 38 | 22.50 | 15.00 | 15.00 | 60.00 | 60.00 | 72.7032 | 90.0000 |
| 37 | 22.00 | 14.50 | 14.50 | 58.50 | 58.50 | 70.7452 | 88.0000 |
| 36 | 21.50 | 14.00 | 14.00 | 57.00 | 57.00 | 68.7892 | 86.0000 |
| 35 | 21.00 | 13.50 | 13.50 | 55.50 | 55.50 | 68.0930 | 84.0000 |
| 34 | 20.50 | 13.00 | 13.00 | 54.00 | 54.00 | 66.1365 | 82.0000 |
| 33 | 20.00 | 12.50 | 12.50 | 52.50 | 52.50 | 64.1818 | 80.0000 |
| 32 | 19.50 | 12.00 | 12.00 | 51.00 | 51.00 | 63.2976 | 78.0000 |
| 31 | 19.00 | -1.50 | -1.50 | 49.50 | 49.50 | 61.3429 | 76.0000 |
| 30 | 18.50 | -1.00 | -1.00 | 48.00 | 48.00 | 59.3902 | 74.0000 |
| 29 | 18.00 | -0.50 | -0.50 | 46.50 | 46.50 | 58.3563 | 72.0000 |
| 28 | 17.50 | 0.00 | 0.00 | 45.00 | 45.00 | 56.4041 | 70.0000 |
| 27 | 17.50 | 0.00 | 0.00 | 45.00 | 45.00 | 56.4041 | 66.2500 |
| 26 | 16.56 | 0.00 | 0.00 | 43.00 | 43.00 | 53.5067 | 62.5000 |
| 25 | 15.63 | 0.00 | 0.00 | 41.25 | 41.25 | 50.5129 | 58.7500 |
| 24 | 14.69 | 0.00 | 0.00 | 39.37 | 39.37 | 47.4391 | 55.0000 |
| 23 | 13.75 | 0.00 | 0.00 | 37.50 | 37.50 | 44.2990 | 51.2500 |
| 22 | 12.81 | 0.00 | 0.00 | 35.63 | 35.63 | 41.1039 | 47.5000 |
| 21 | -1.88 | 0.00 | 0.00 | 33.75 | 33.75 | 38.2660 | 43.7500 |
| 20 | -0.94 | 0.00 | 0.00 | 31.88 | 31.88 | 35.2874 | 40.0000 |
| 19 | 0.00 | 0.00 | 0.00 | 30.00 | 30.00 | 32.2013 | 38.6667 |
| 18 | 0.00 | 0.00 | 0.00 | 28.67 | 28.67 | 31.1671 | 37.3333 |
| 17 | 0.00 | 0.33 | 0.33 | 27.33 | 27.33 | 30.1411 | 36.0000 |
| 16 | 0.00 | 9.67 | 9.67 | 26.00 | 26.00 | 29.0446 | 34.6667 |
| 15 | 0.00 | 9.33 | 9.33 | 24.67 | 24.67 | 27.9608 | 33.3333 |
| 14 | 0.00 | 9.00 | 9.00 | 23.33 | 23.33 | 26.8647 | 32.0000 |
| 13 | 0.00 | 8.67 | 8.67 | 22.00 | 22.00 | 25.7579 | 33.4000 |
| 12 | 0.00 | 8.33 | 8.33 | 23.30 | 23.30 | 26.9322 | 34.8000 |
| 11 | 0.00 | 8.00 | 8.00 | 24.60 | 24.60 | 27.8860 | 36.2000 |
| 10 | 0.00 | 8.35 | 8.35 | 25.90 | 25.90 | 29.0201 | 35.8000 |
| 9 | 0.00 | 8.70 | 8.70 | 27.20 | 27.20 | 29.1380 | 36.2000 |
| 8 | 0.00 | 9.05 | 9.05 | 28.50 | 28.50 | 30.1380 | 37.6000 |
| 7 | 0.00 | 9.40 | 9.40 | 29.80 | 29.80 | 31.2373 | 39.0000 |
| 6 | 0.00 | 9.75 | 9.75 | 31.10 | 31.10 | 33.6792 | 40.4000 |
| -0.45 | | 10.20 | 10.20 | 32.40 | 32.40 | 33.6792 | 41.8000 |
| -0.80 | | 10.80 | 10.80 | 33.70 | 33.70 | 34.7334 | 43.2000 |
| -1.15 | | -1.40 | -1.40 | 33.70 | 33.70 | 35.7598 | 44.6000 |
| -1.50 | | -2.00 | -2.00 | 35.00 | 35.00 | 36.7546 | 46.0000 |

—— $= \cos \frac{\pi t}{T}$

······ $= \left(\cos \frac{\pi t}{T}\right)\left(1 - \frac{.46 t}{T}\right)$

TRUNCATOR AMPLITUDE SPECTRA

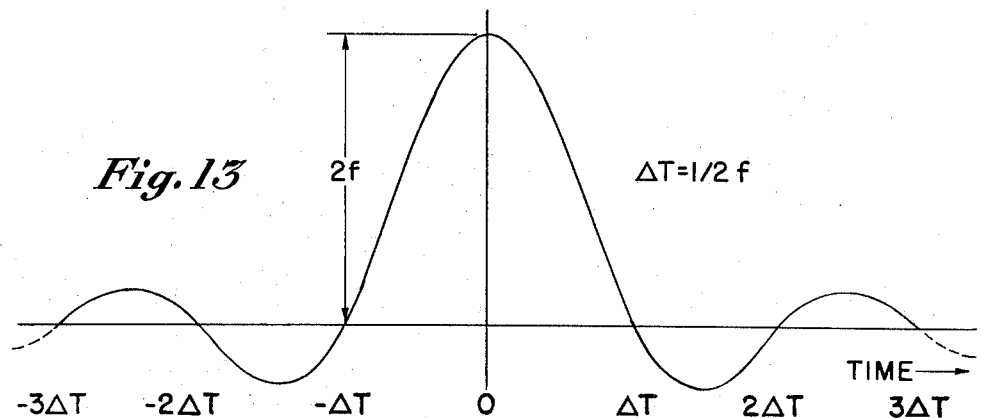
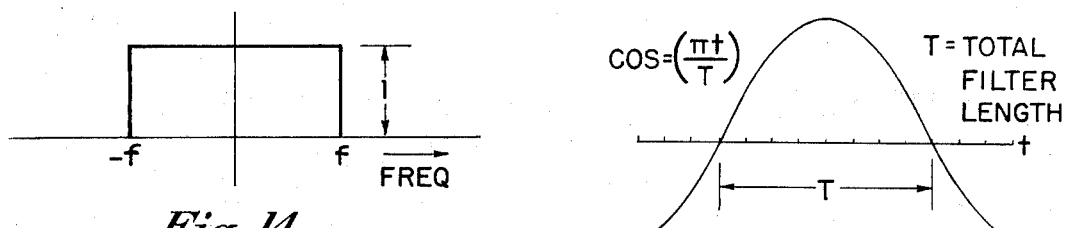
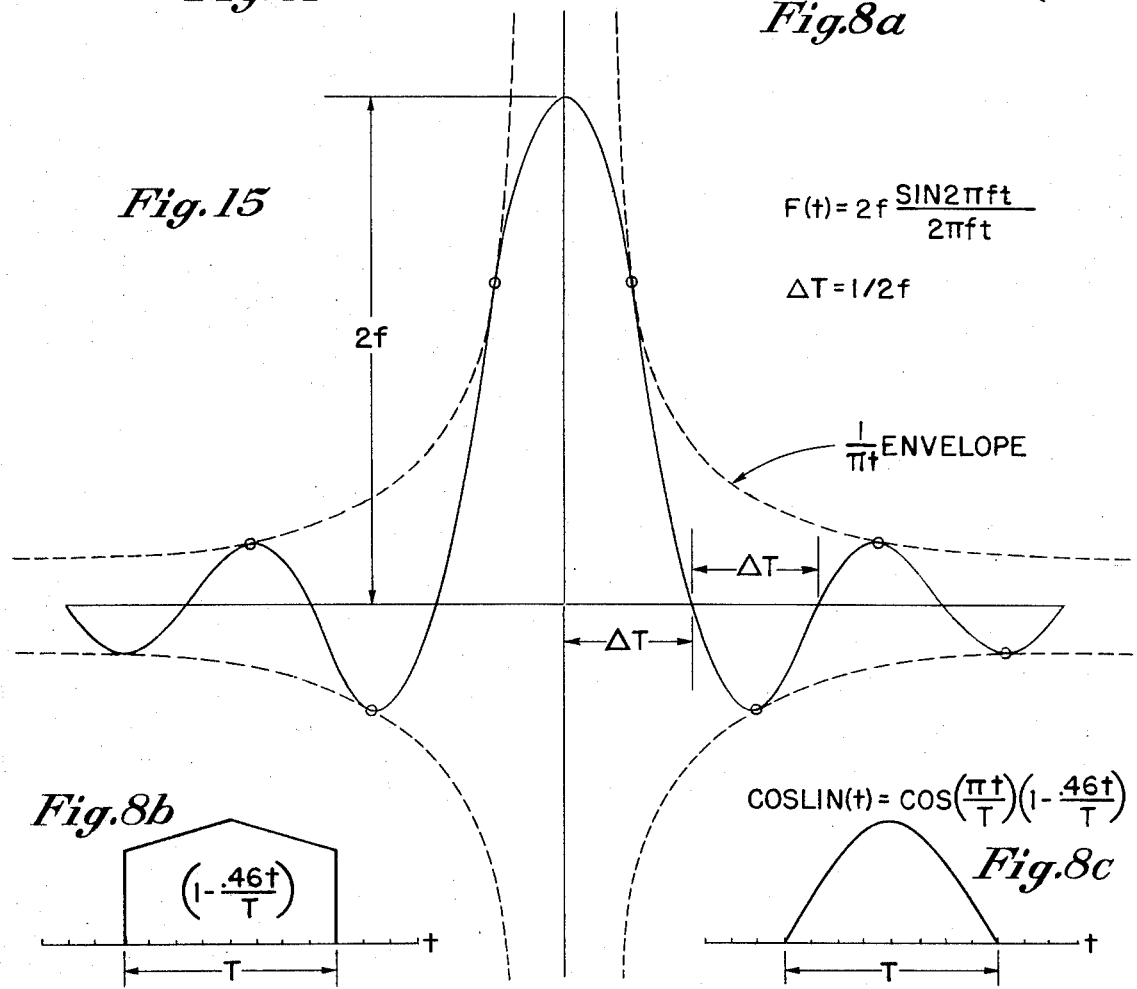

- —o——o— RECT TRUNCATOR
- — — — TRAP TRUNCATOR
- ·······  TRI TRUNCATOR
- ———— COSLIN TRUNCATOR

200 MIL 20/60 SINC

5:1 SCALE CHANGE $= \cos \frac{\pi t}{T}$ $= 1 - \frac{.46 t}{T}$

TRUNCATOR AMPLITUDE SPECTRA

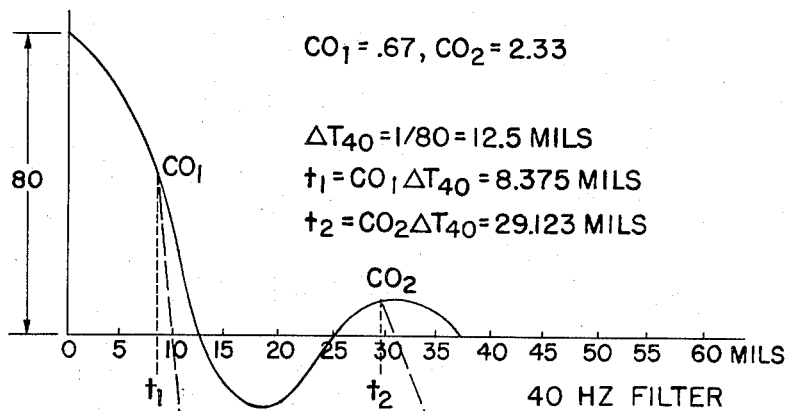
*Fig. 16*
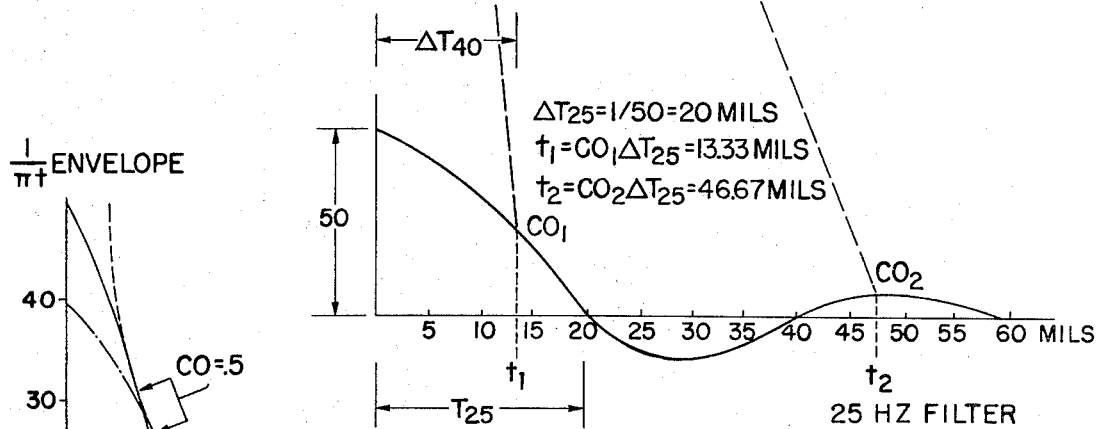
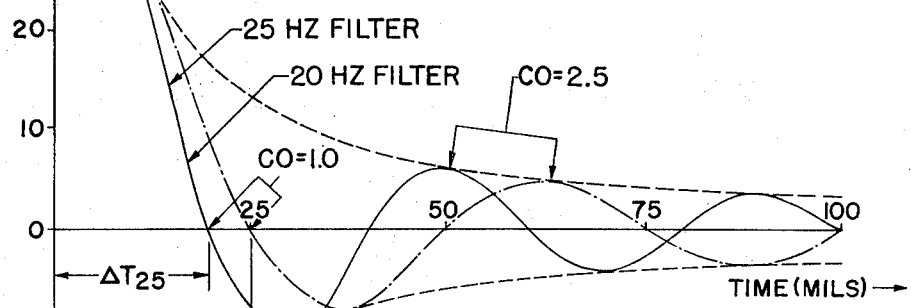
*Fig. 17*

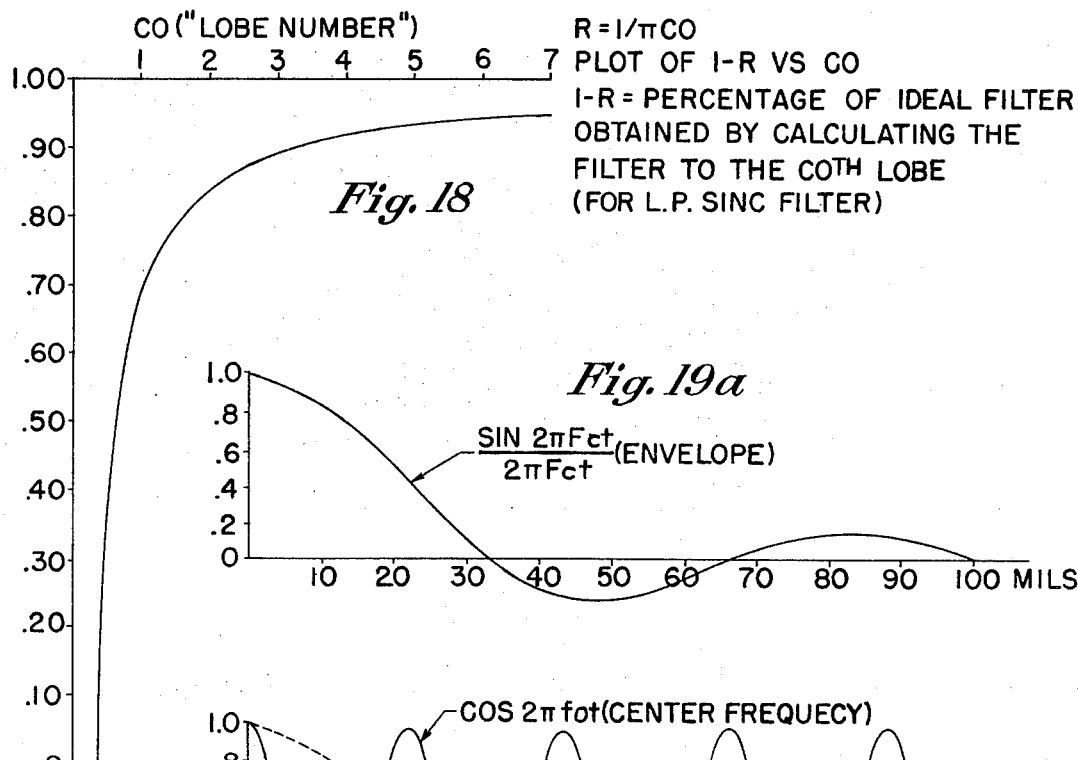

*Fig. 18*

CO ("LOBE NUMBER")

$R = 1/\pi CO$
PLOT OF $1-R$ VS CO
$1-R$ = PERCENTAGE OF IDEAL FILTER OBTAINED BY CALCULATING THE FILTER TO THE $CO^{TH}$ LOBE
(FOR L.P. SINC FILTER)

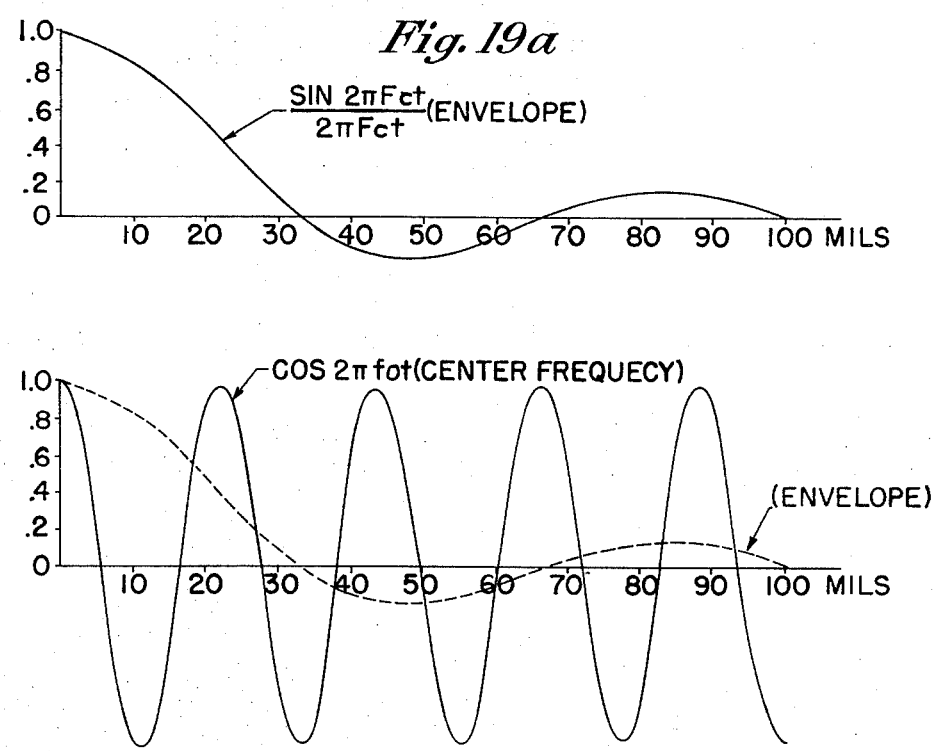

*Fig. 19a*

$\dfrac{\sin 2\pi F_c t}{2\pi F_c t}$ (ENVELOPE)

*Fig. 19b*

$\cos 2\pi f_o t$ (CENTER FREQUECY)

(ENVELOPE)

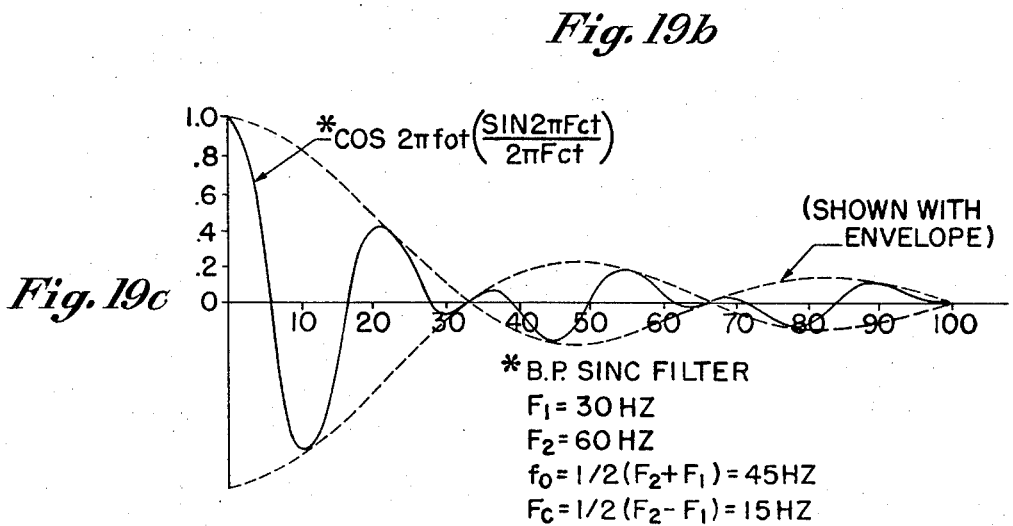

*Fig. 19c*

$*\cos 2\pi f_o t \left(\dfrac{\sin 2\pi F_c t}{2\pi F_c t}\right)$ (SHOWN WITH ENVELOPE)

*B.P. SINC FILTER
$F_1 = 30\,HZ$
$F_2 = 60\,HZ$
$f_0 = 1/2(F_2 + F_1) = 45\,HZ$
$F_c = 1/2(F_2 - F_1) = 15\,HZ$

PROCESS OF FORMING TIME-VARIANT FILTERS FOR FILTERING SEISMIC DATA

BACKGROUND OF THE INVENTION

This invention relates to a process of forming a set of time-variant filters for filtering a time series of seismic data (seismic traces).

Seismic traces recorded by conventional field techniques includes sought-after signals that have frequencies within a band that generally changes to lower frequencies down the record as a function of time. In order to increase the signal to noise ratio, the seismic traces are filtered with time-variant filters. This is done in order to follow the frequency band of the sought after signals as it changes down the record.

Conventional practice is to convert or record the seismic traces in digital form and to filter the data with digital filters in the time domain by convolution.

Problems have existed in applying more than one digital filter to a seismic trace in that the time response of one filter may be abruptly dissimilar to that of another. The convolution of an input time series with abruptly different filters produces an undesirable discontinuity on the output.

SUMMARY OF THE INVENTION

In accordance with the present invention, there is provided a unique process of determining a set of time-variant filters wherein the time responses of adjacent filters are very similar, thereby resulting in an improved output when employed to filter seismic data. The process is carried out in an automatic computing system and forms a set of time-variant filters from an input set of filters having predetermined start times. In carrying out the process, there are determined the center frequency and envelope frequency of adjacent input filters of the input set. Filters then are interpolated between adjacent input filters. The envelope frequencies of the interpolated filters are determined and the length of the input filters and interpolated filters are determined as inversely proportional to their envelope frequencies.

In a further aspect, the center frequency difference between adjacent input filters is determined and the number of filters to be interpolated between adjacent input filters are determined as a function of the difference in center frequencies between adjacent input filters.

In the embodiment disclosed, the number of filters to be interpolated between adjacent input filters are set equal to the number of integer frequency changes between adjacent input filters minus one. The envelope frequencies of the interpolated filters between adjacent input filters are determined by a linear interpolation between the envelope frequencies of adjacent input filters. The start times of the interpolated filters between adjacent input filters are determined by placing the interpolated filters at equally spaced time intervals between adjacent input filters.

In forming the set of time-variant filters, the time responses of each of the filters is calculated to their respective lengths. The time responses then are truncated with a truncator having the same length as the time responses and defined in the following manner:

$$COS[(\pi t)/T] \cdot [1 - (9.46t)/T]$$

where $T$ is the filter length in time and $t$ is time for the center of each filter. Following truncation, DC removal and energy normalization are carried out.

BRIEF DESCRIPTION OF THE DRAWINGS

FIG. 4 is a computer print-out of a set of input filters and a complete output set of time-variant filters;

FIGS. 8A and 8B illustrate the shape of two curves employed to obtain the truncator of FIG. 8C;

FIG. 13 illustrates the time response for a low-pass sinc filter;

FIG. 14 illustrates the frequency response of the filter of FIG. 14;

FIG. 15 illustrates a low-pass sinc time response and $1/\pi t$ envelope;

FIG. 16 illustrates a time scale change between low-pass sinc filters;

FIG. 17 illustrates lobe numbers of low-pass sinc filters;

FIG. 18 illustrates the lobe number vs. decay ratio of low-pass sinc filters; and, FIGS. 19A–19C illustrate band-pass sinc construction via center frequency and envelope.

DETAILED DESCRIPTION OF THE INVENTION

Figure 1:
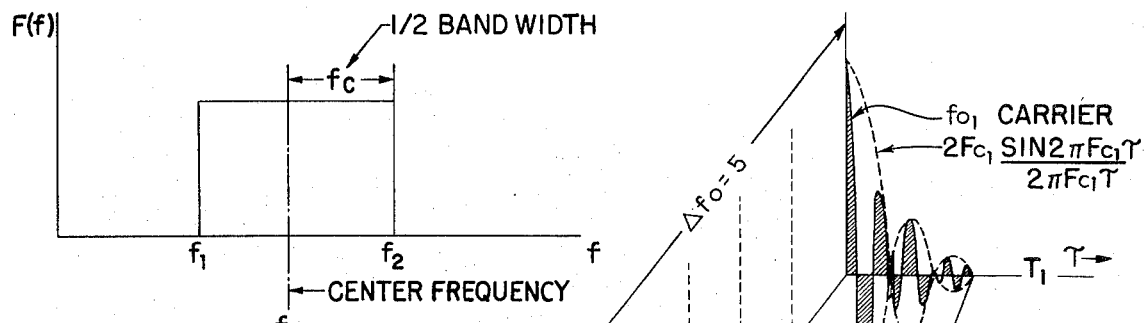
FIG. 1 illustrates the frequency spectrum of a band-pass rectangular filter.
Figure 2:
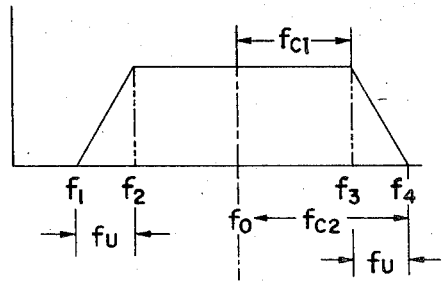
FIG. 2 illustrates the frequency spectrum of a band-pass trapazoidal filter.

Referring to FIG. 1, there is illustrated the frequency spectrum of a band-pass rectangular filter. FIG. 2 illustrates the frequency spectrum of a band-pass trapazoidal filter. In the trapazoidal filter, the frequencies $f1$ and $f4$, are the cutoff frequencies while the frequencies $f2$ and $f3$, are the corner frequencies. The trapazoidal filter reduces to a rectangular filter by making $f1$ equal $f2$ and $f4$ equal $f3$. The frequency $fo$ is the center frequency. In the case of the band-pass rectangular filter, $fc$ may be defined as one-half the band width while in the case of the band-pass trapazoidal filter, $fc$ may be defined as the average half band-width. The term $fc$ also may be defined as a low-pass sinc envelope frequency. This will be explained more fully subsequently.

In the time domain, the rectangular band-pass filter may be defined as a band-pass sinc filter, while the band-pass trapazoidal filter may be defined as a band-pass sinc squared filter. As will be explained subsequently, one may view the time response of a band-pass sinc filter as obtained by modulating a carrier signal at the filter's center frequency ($fo$) by a low-pass sinc filter, with a cut-off frequency of half the band-pass filter's band-width ($fc$). Thus, a band-pass sinc filter has a low-pass sinc filter envelope.

The band-pass sinc filter's center frequency is given by $$NFZ = \tfrac{1}{2}(F2+F3) \quad (1)$$

The low-pass sinc envelope frequency may be defined as $$FC = \tfrac{1}{4}(F4+F3-F2-F1) \quad (2)$$

In the following description, NFZ and $fo$ will be referred to interchangeably as the center frequency. In the computer program, it is given the integer variable name NFZ. In addition, for purposes of the computer program, certain variables will be capitalized although referred to in certain portions of the specification in the small letter case.

A symmetrical sinc-squared filter may be viewed as a center frequency carrier signal modulated by a low pass sinc filter whose frequency is the average one-half band width of the sinc-squared filter and which in turn is modulated by another low-pass sinc filter whose frequency is quite low and acts, therefore, as a truncator.

In forming the desired set of time-variant filters, an input set of filters are first selected to be placed at their desired start times. The start times and the band-pass of the input filters are determined by analyzing the data, i.e., by frequency analysis, to determine the frequency of the data and where it changes whereby it can be determined where changes are needed in the input filters to adapt to the frequency changes. In the program disclosed, nine input filters may be selected for a given record. A record typically is 24 traces, however, it could comprise more or less traces. These traces may be CDP gathered, in a field format, or they may be stacked or unstacked. They are traces, however, that one desires to filter and in the embodiment disclosed they are a time series and in digital form.

Figure 3:
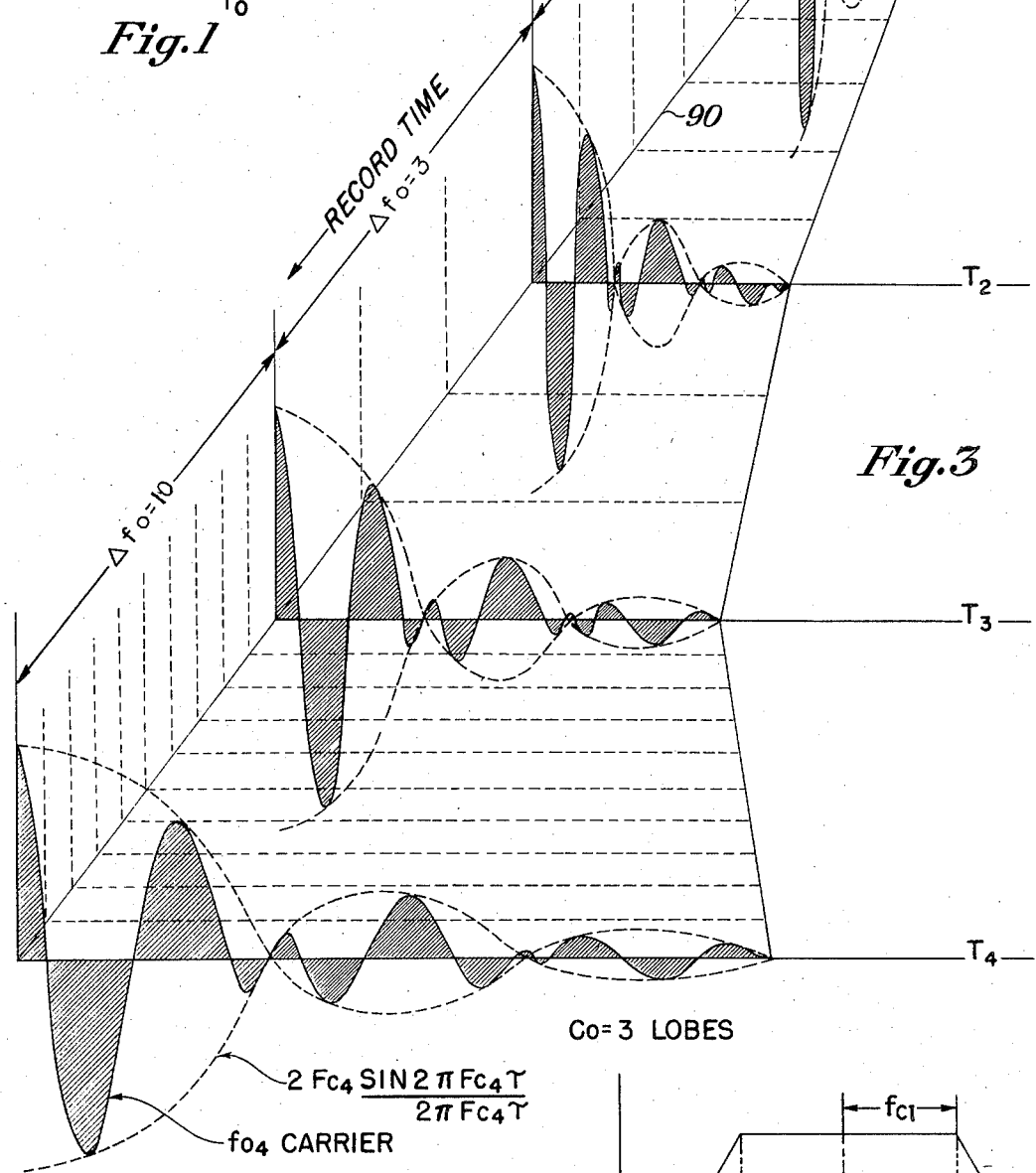
FIG. 3 illustrates in schematic form input filters of a set of time-variant filters.

Referring to FIG. 3, there is illustrated in schematic form input filters selected at times T1, T2, T3 and T4. In this FIG. record time increases toward the left. At the times selected, the band width and the type of filter desired to be inputted are known. Thus, the cutoff frequencies, $f1$ and $f4$ and the corner frequencies $f2$ and $f3$, are known. In the program disclosed, the input filters may be either band-pass sinc filters or band-pass sinc squared filters. In addition, they may be interchanged in a given set of time-variant filters to be determined.

In FIG. 3, the center or carrier frequency of the input filters is illustrated by the crossed-hatched traces while the envelope frequency is illustrated by the curved dotted traces. The figure illustrates only one-half of the filters in the time domain. In reality, the filter lengths will be along the line 90. The filters are rotated 90° in FIG. 3 to illustrate their relative lengths.

In the program disclosed, the center frequency NFZ and the envelope frequency FC of the Ith and Ith+1 input filters are calculated. This is done in accordance with Equations (1) and (2) respectively. The length of the Ith filter also is determined.

Additional filters, then, are interpolated between the Ith and Ith+1 input filters. The number of filters to be interpolated is determined as well as their envelope frequencies, their cut-off and corner frequencies, their start times, and their lengths. The Ith filter is incremented and the process repeated until all of these parameters have been computed for the complete set of time variant filters.

The number of filters to be interpolated between the Ith and Ith+1 input filters is dependent upon the difference in center frequency between these adjacent input filters. In the program disclosed, this number is set equal to the number of integer center frequency changes between adjacent input filters minus one. This may be expressed in the following manner:

$$N = NFZ(I) - NFZ(I+1) - 1 \quad (3)$$

Where N is the number of filters to be placed between the Ith and the Ith+1 inputs, NFZ(I) is the center frequency at the Ith input, while NFZ(I+1) is the center frequency at the Ith+1 input.

For example, in FIG. 3, between T1 and T2, the difference in center frequency is 5 hertz. Thus, N is equal to 4, whereby four filters are to be interpolated between the first two input filters. The center frequency difference between interpolated filters is equal to 1 hertz.

A further explanation is given by reference to FIG. 4. This figure is a computer printout of a set of input filters and times and a complete output set of time-variant filters including the input filters and interpolated filters. In this example, six input filters were selected at times of 800, 1,400, 1,800, 2,000, 2,500, and 4,000 mils. The input set of filters were band-pass sinc filters and their cutoff and corner frequencies are shown under F1, F2, F3, and F4. Referring to the first two input filters selected at time 800 mils and 1,400 mils, their center frequencies were calculated to be 38 and 28 hertz, respectively. The difference in center frequencies thus is equal to 10. The number of filters to be interpolated between the first two input filters, thus, is equal to 10 minus 1, which is 9. Each filter will be 1 hertz apart in center frequency from its neighbors. Thus, the interpolated filters from the first input filter will have center frequencies respectively of 37, 36, 35, 34, 33, 32, 31, 30, and 29 hertz.

The envelope frequencies FC of each of the interpolated filters, are obtained by linearly interpolating N times between FC(I) and FC(I+1). FC(I) is the envelope frequency of the Ith input filter, while FC(I+1) is the envelope frequency of the Ith+1 input filter. As can be seen in FIG. 4, the envelope frequency of the first input is 22.50 hertz while that of the second input is 17.50 hertz. The difference in envelope frequency is 5 hertz. Thus, the difference in envelope frequency between the interpolated filters (between the first two input filters) is equal to 0.50 hertz.

The frequencies F1, F2, F3, and F4 of the input set of filters is known from the input filters selected. In the program disclosed, in the same loop that the envelope frequencies are being interpolated for the interpolated filters, a linear interpolation is carried out to find F1, F2, F3, and F4 for each of the interpolated filters. These values are set forth in FIG. 4 for the specific input set of time-variant filters disclosed in that figure.

The interpolated filters are spaced apart at equal time intervals between adjacent input filters. The time separation in mils between the interpolated filters may be expressed in the following manner:

$$[T(I+1) - T(I)]/(N+1) \qquad (4)$$

T(I) is the time of the Ith input filter and T(I+1) is the time of the Ith+1 input filter. Referring to FIG. 4, it can be seen that the times difference between the first input filter and the second input filter is 600 mils. By dividing N+1 into 600, one obtains a 60 mil separation between interpolated filters. Thus, the interpolated filters, between the first two input filters, are placed at 860, 920, 980, 1,040, 1,100, 1,160, 1,220, and 1,340 mils.

The length of each filter in time is determined according to the relation:

$$K/FC \qquad (5)$$

In this expression, K is a constant for all of the filters. FC is the envelope frequency for the specific filter of which the length is being calculated. Thus, since K is constant for all of the filters, a consistent filter description will be maintained for all the filters in the set to be determined. In FIG. 3, the constant employed is 3, which defines 3 lobes of the envelope frequency. Thus, each filter of FIG. 3 is calculated to three lobes of its low-pass envelope frequency.

Since the length of each filter is inversely proportional to its envelope frequency, each filter will be calculated to the same percentage decay point. The lengths may be different but the percentage decay of each filter is the same. Thus, each filter will have the same shape and represent the same percentage of the total ideal filter. This will be described in more detail subsequently. Therefore, each filter will be very similar to its neighbor, whereby a smoothly varying set of filters with record time will be obtained. The similarity is sufficient to completely eliminate any discontinuities in the output data.

When the time responses for these filters are calculated using the above criterion and viewed in the manner of FIG. 3, they represent a smoothly varying continuum of filters with record time. In FIG. 3, the interpolated filters are illustrated by the vertical and horizontal dashed lines. The horizontal dashed lines represent the lengths of the interpolated filters. This figure is not a perspective drawing so that there is no foreshortening and the horizontal time scales, (filter lengths) are all to one scale. The amplitudes have been normalized to one value.

Figure 5:
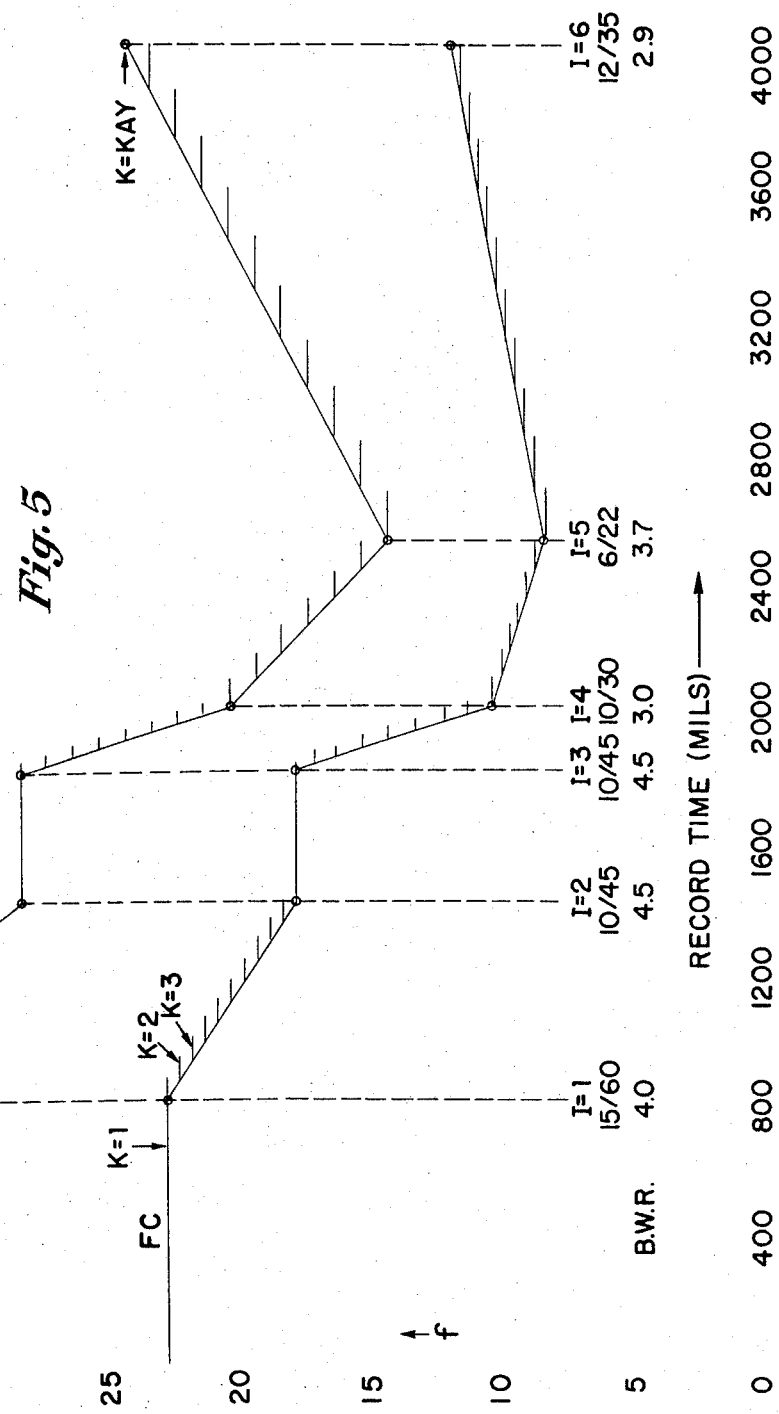
FIG. 5 is a plot of the variation with time of the center frequencies and envelope frequencies of the filters of FIG. 4.
Figure 6:
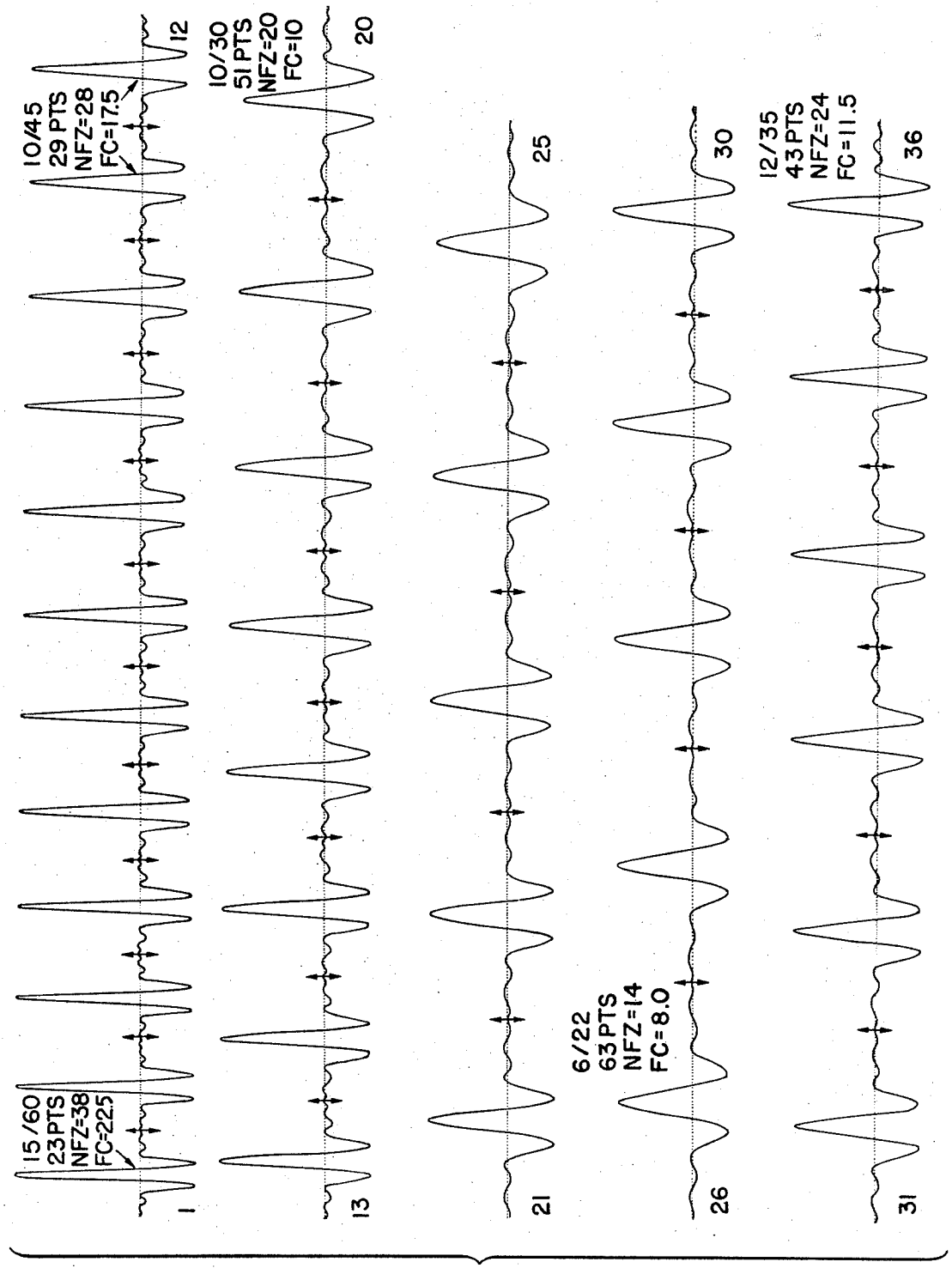
FIG. 6 illustrates a completed set of properly adjusted time responses of the filters of FIG. 4 as they exist side by side in a filter storage array.

The filters of FIG. 3 were calculated to three lobes while those of FIGS. 4–6 are calculated to two lobes.

The filter lengths of the filters of FIGS. 4–6 were calculated to sample lengths by the following relation:

$$\text{Number of Points} = 2,000/(FC \cdot ISAMP) + 0.5 \qquad (6)$$

The time of a low-pass sinc filter at the end of its first lobe at one-half of its time response is equal to ½FC. At the end of its second lobe, at one-half of the time response, time is equal to 1/FC. Thus, the full length in time of a low-pass sinc filter, at the end of the second lobe, is equal to 2/FC. In order to convert to sample length, one may divide 2/FC by ISAMP/1000. Where ISAMP is the time interval between samples in mils, the value 0.5 is added in order to round off rather than truncate.

FIG. 5 is a plot of the variation with time of the center frequencies and envelope frequencies of the filters of FIG. 4. The positions of the input filters are along the vertical dashed lines. The interpolated filters are places between the input filters. Note that between the input filters at 1,400 and 1,800 mils, there is no difference in center frequency or envelope frequency. Hence, filters are not interpolated between these inputs. Note also that the center frequency vs. record time curve ranges both up and down and that the band width ratio (B.W.R.) varies and is not constant.

After the process has been incremented through all of the input filters, there is known the total number of filters in the set, their start times, their center frequencies, their envelope frequencies, their lengths, and their cut-off and corner frequencies F1, F4, and F2 and F3.

The next step in obtaining the desired set of time-variant filters is to calculate the time responses of each filter. These responses are calculated out to the proper filter length defined by K/FC. In the case of the sinc band-pass filters, the time responses are calculated in accordance with expression 7, while in the case of the sinc squared band-pass filters, the time responses are calculated in accordance with the expression 8.

$$F(t) = [2f2 \text{SINC} 2f2t - 2f1 \text{SINC} 2f1t]$$
$$= g[\text{SIN} 2\pi f2t - \text{SIN} 2\pi f1t]/\pi t \qquad (7)$$
$$\text{where } g = [2(f2-f1)]^{-1}$$

$$F(t) = h \, [f4^2 \text{SINC}^2 f4t - f3^2 \text{SINC}^2 f3t)/(f4-f3)$$
$$- (f2^2 \text{SINC}^2 f2t - f1^2 \text{SINC}^2 f1t)/(f2-f1)] \qquad (8)$$
$$\text{where } h = [f4+f3-f2-f1]^{-1}$$

FIG. 6 illustrates a completed set of properly adjusted time responses of the filters of FIG. 4 as they exist side by side in the filter array (where the completed time responses are stored).

Figure 7:
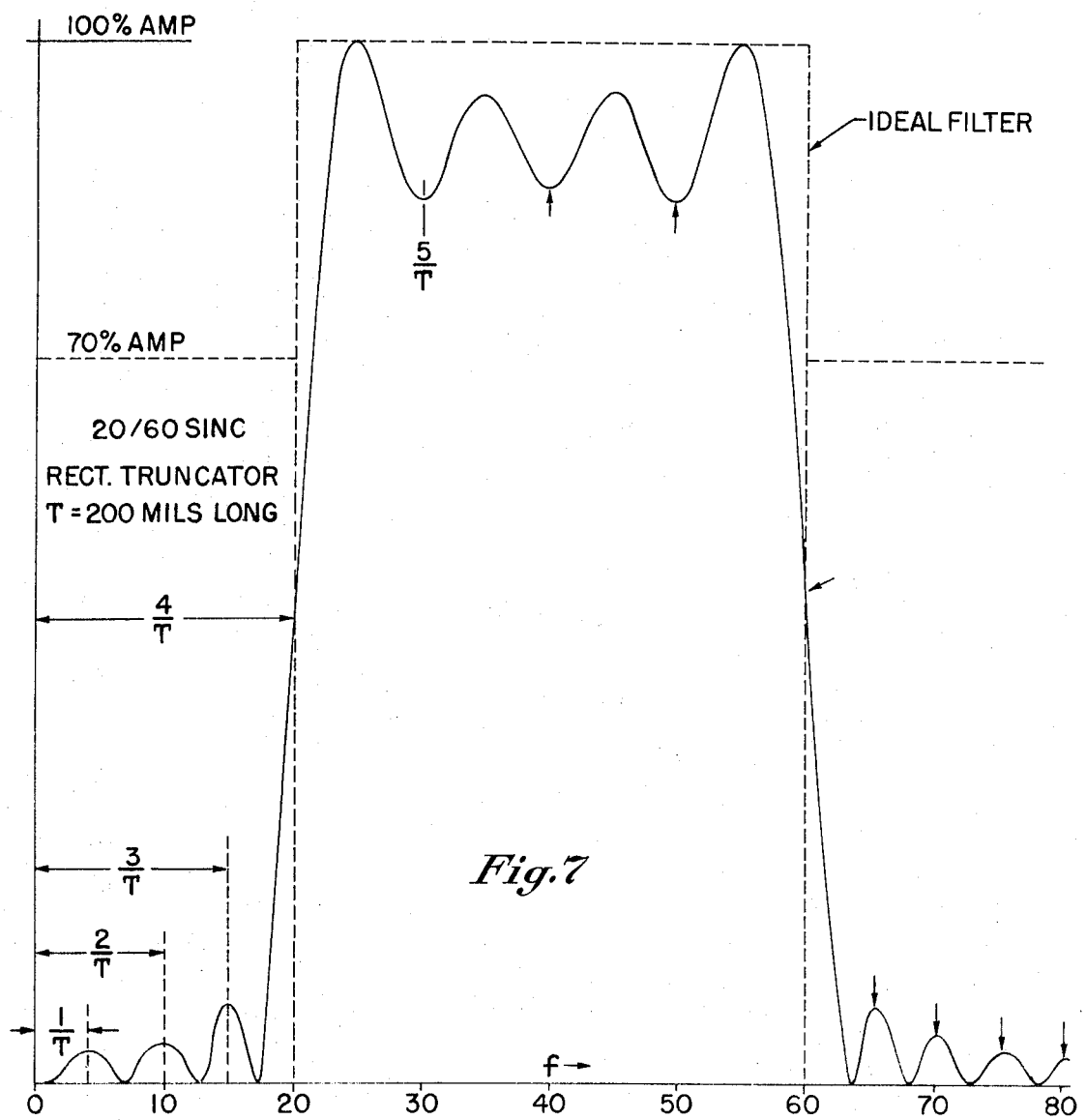
FIG. 7 is an amplitude-frequency plot of a 20–60 sinc filter.

Calculating the time responses to their proper length and abruptly stopping calculation at that point is the same as applying a rectangular truncator to the time responses. The application of a rectangular truncator to the time responses, however, gives rise to notching inside the pass-band and peaks outside of the pass-band. This is illustrated in FIG. 7, which is an amplitude-frequency plot for a 20–60 sinc filter, the time response for which was calculated to the end of the fourth envelope lobe and abruptly stopped. The truncation time was 100 mils each side of t equal zero, or 200 mils. Since the envelope ($fc=20$ hertz) drives the time response to zero every 25 mils, hence, zero at plus or minus 100 mils, none of the effects seen in FIG. 7, are due to the end samples being non-zero.

One method of minimizing the notching effects in a filter, such as that in FIG. 7, is to convolve the frequency spectrum with another (appropriate) spectrum and use the convolved (smoothed) output. Since convolution in the frequency domain is equivalent to multiplication in the time domain, one needs merely to find the proper truncator and multiply it with the time series term by term.

Several truncators were considered and one which produced vastly improved results is defined by the following expression:

$$COS[(\pi t)/T] \cdot [1-(0.46t)/T] \quad (9)$$

In expression (9), T is the total filter length (i.e., truncation period) and $t$ is time along the filter, ($t$ equals zero at the center of the filter). The first factor is a cosine truncator. It is a cosine wave centered at the filter's center with a period of twice the total filter length. Hence, only half of one cycle is used.

The second factor in expression (9) is a straight line with the level of 1 at $t=0$ and a value of 0.77 at both edges of the filter.

FIGS. 8A and 8B show the shape of the two factors while FIG. 8C shows the resulting truncator. Since the truncator is the product of a cosine truncator with a linear truncator, the name "COSLIN" seemed appropriate.

Figure 9B:
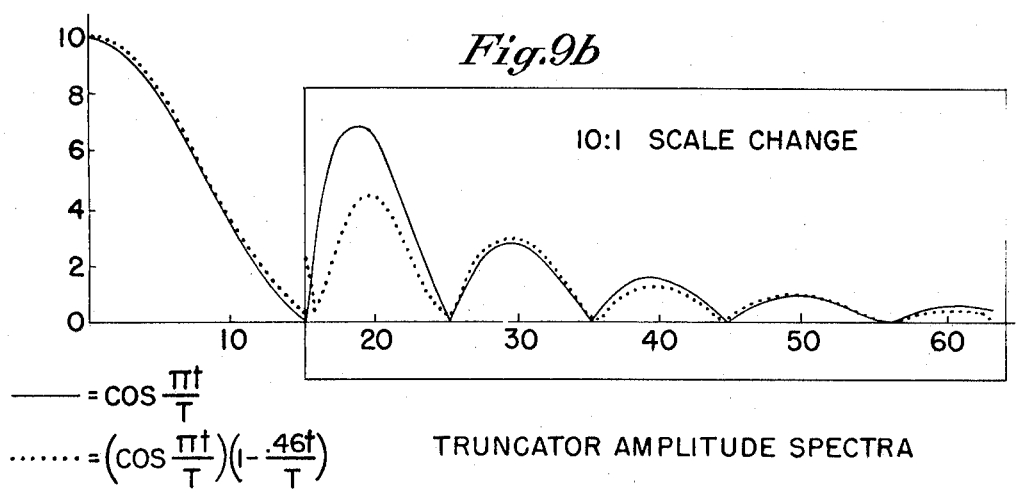
FIG. 9B is a comparison plot of the Fourier transforms of a cosine truncator and the special truncator of the present invention.
Figure 9A:
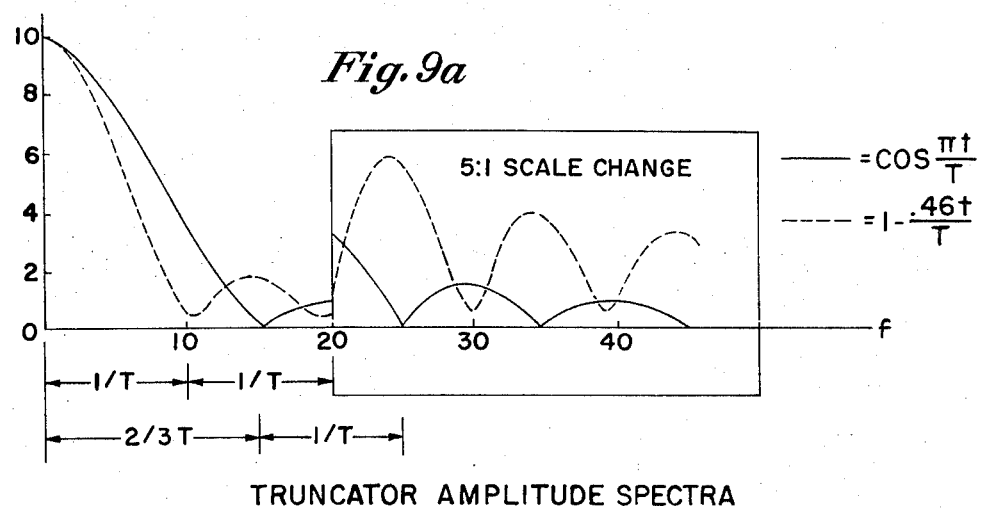
FIG. 9A is a plot of the Fourier transforms of the two curves of FIGS. 8A and 8B.

FIG. 9A shows plots of the Fourier transforms of the two factors, while FIG. 9B is a comparison plot of the Fourier transforms of the cosine and "COSLIN" truncators.

The benefit of the "COSLIN" function over the cosine truncator stems from the considerably reduced second lobe of the "COSLIN" transform. Notice, too, that the main lobe of the "COSLIN" transform is only slightly different from the cosine spectrum.

Bear in mind that multiplying an ideal filter time response by a truncator is equivalent to convolving the transforms of the two time functions in the frequency domain. It is the structure of the main lobe which largely determines the physically realizable filter's roll-off rate while the relative size of the second lobe strongly influences the rippling inside and outside the passband. It is the act of convolving the second lobe through the ideal filter spectrum which provides the ripple effect.

The convolution of the linear function's transform with the cosine transform results in the considerably reduced second lobe seen in FIG. 9B.

Figure 10:
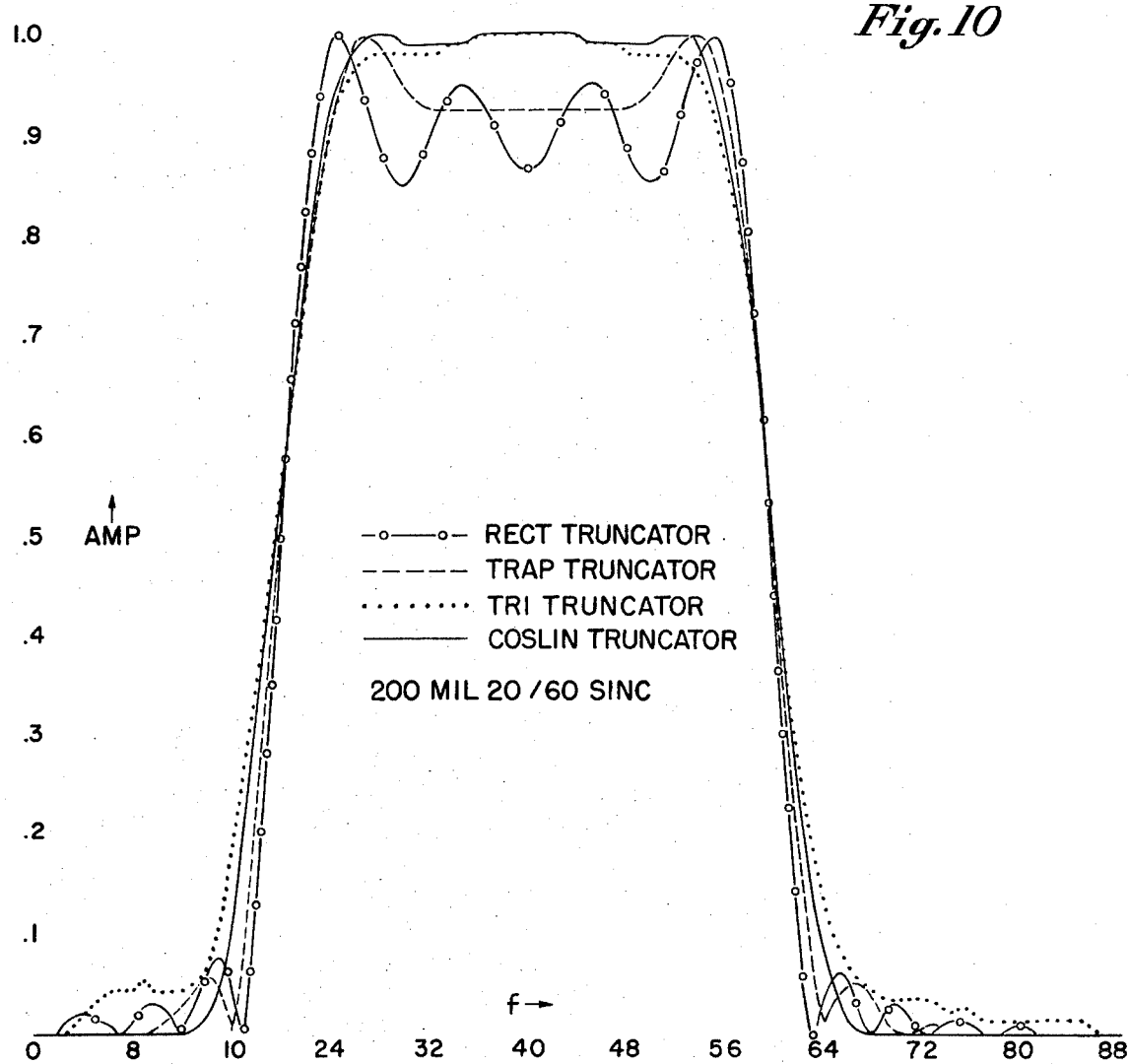
FIG. 10 illustrates the result of using the special truncator of the present invention on a 20–60 hertz sinc filter, as well as the results obtained by using several other common truncators.

The result of using the "COSLIN" truncator on a 20–60 hertz sinc filter is presented in FIG. 10, along with the results obtained by using several common truncators, the latter of which were a rectangular truncator, a trapazoidal truncator, and a triangular truncator.

Truncating with the "COSLIN" truncator function shows considerable improvement within the pass-band over the other truncators, while, at the same time, the reject zones drop close to zero and stay there. The rejection rate lies midway between the triangularly and the trapazoidally truncated responses.

At this point, the following algorithm summarizes the process in obtaining the set of time-variant filters. This algorithm takes the input set of filters at their respective start times and calculates NFZ, FC pairs for each input filter. It then places additional pairs in the set to fill out the intermediate, integer values of NFZ. The number of pairs obtained between the Ith and the Ith+1 input is $$N=NFZ(I)-NFZ(I+1)-1 \quad (10)$$

These are to be placed [T(I+1)−T(I)]/(N+1) mils apart in time. The FC values are obtained by linearly interpolating N times between the FC(I) and FC(I+1) through this same time interval. The FC values are used to obtain the proper filter length according to the relation K/FC. The time responses of the filters then are calculated to their proper lengths and truncated with the following truncator:

$$COS[(\pi bit)/T] \cdot [1-(0.46t)/T]$$

The time responses of the filters are then DC corrected and energy normalized. D. C. Bias in a digital filter occurs when the discrete, finite time series representing that filter has other than a zero mean. It is corrected by summing the total series (to obtain a net area) and dividing this sum by the number of samples in the filter to arrive at an average bias per sample. This value then is subtracted from each sample in the filter. The D. C. removal is done after the filter has been truncated so that the end sample actually is raised, (or lowered), from zero. If, as in the program under discussion, the filter times series is taken sufficiently long, the effect of raising the end sample by the filter's average bias per sample is extremely small, and the end sample may be zeroed out once more with impunity.

When filtering a single-time series with more then one filter, one may encounter the problem of energy differences.

For the sake of this discussion, the energy of a filter is defined as the sum of the squared values of its time response. This is related, by Parseval's theorum to the sum of the squared values of its amplitude response. In other words, the energy in the time domain is related to the energy in the frequency domain. This may be defined as:

$$\text{Energy} = K_0 \sum^T F(t)^2 = K_1 \Sigma F(\omega)^2$$

If one does not normalize each of the filters to unit energy, (or some other constant value of energy), the filtered output may well display amplitude contrasts. That is to say, the filter output will contain average amplitude levels relating to the energies of the different filters rather than the input time series.

In the algorithm under discussion, each filter has an energy only very slightly different from that of its adjacent filters so that the contrast, even without energy normalization would be barely discernable. However, the contrast between a high frequency filter at the beginning of the time series, (traces), and a low frequency filter at the end of the trace might well be pronounced. This is completely overcome by actually calculating the energy from the above equation and dividing each sample in the filter by the square root of this value, so that the normalized filter has unit energy.

In FIG. 4, the power values shown is the energy as calculated by the sum of the squares of the truncated time response of each filter. The area values represent the area in the frequency domain of the corresponding ideal filter.

The process of the present invention in forming the desired set of time-variant filters has advantages in that filters very similar to its neighbor are obtained, thereby avoiding discontinuities on the output when convolving with an input time series. In addition, the start times of the input filters may be exactly specified, and the bandwidth ratios do not have to be maintained constant. Sinc or sinc-squared filters may be used interchangeably in a given set and the frequencies of the filters may increase or decrease with record time. The filters may be calculated to relatively long lengths which results in a filter being closer to the ideal filter. Moreover, the new type of truncator gives improved results and high speed filtering may be obtained with the complete set of filters.

Figure 11:
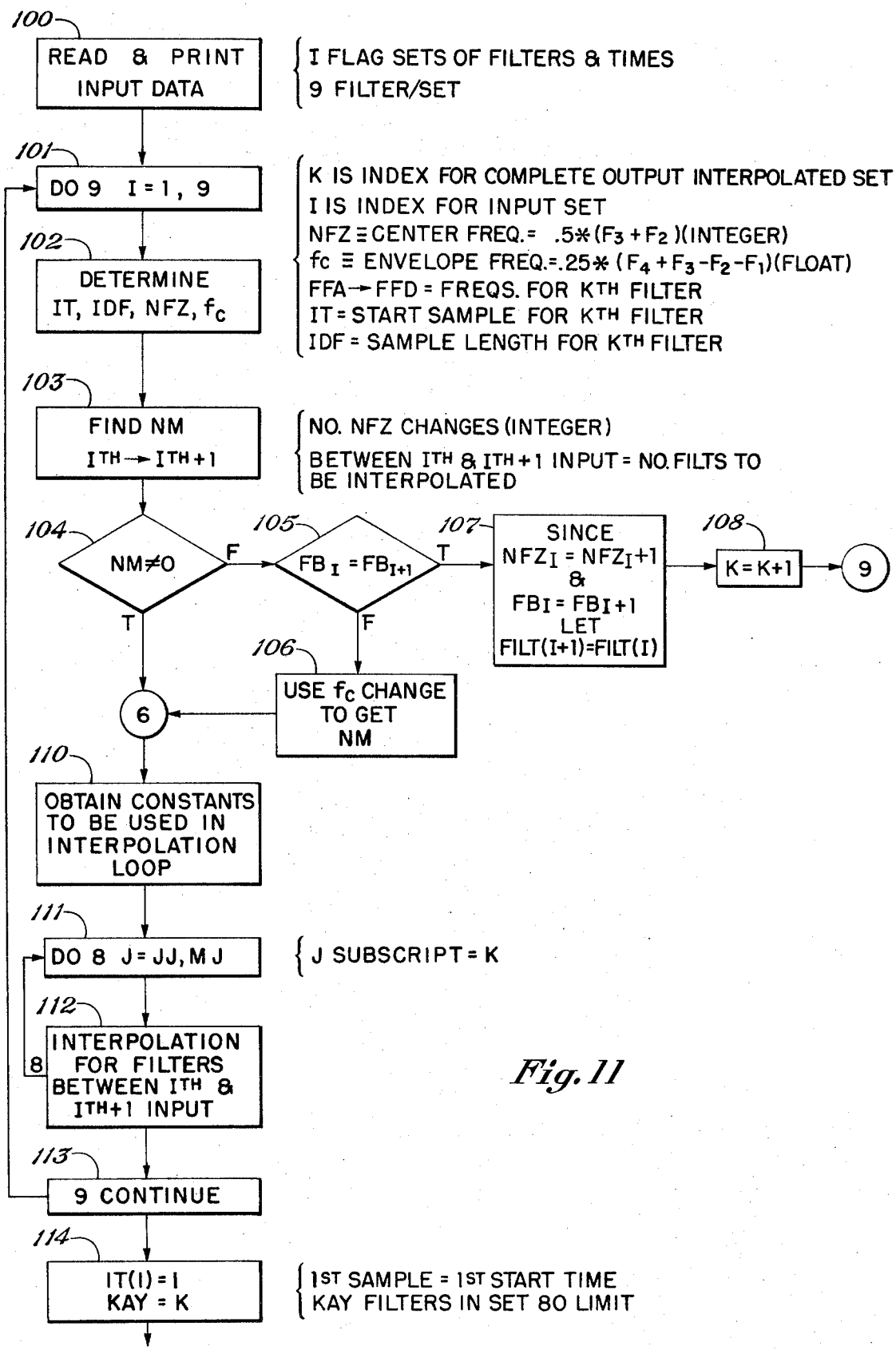
FIGS. 11 and 12 illustrate a flow diagram of the process of the present invention.
Figure 12:
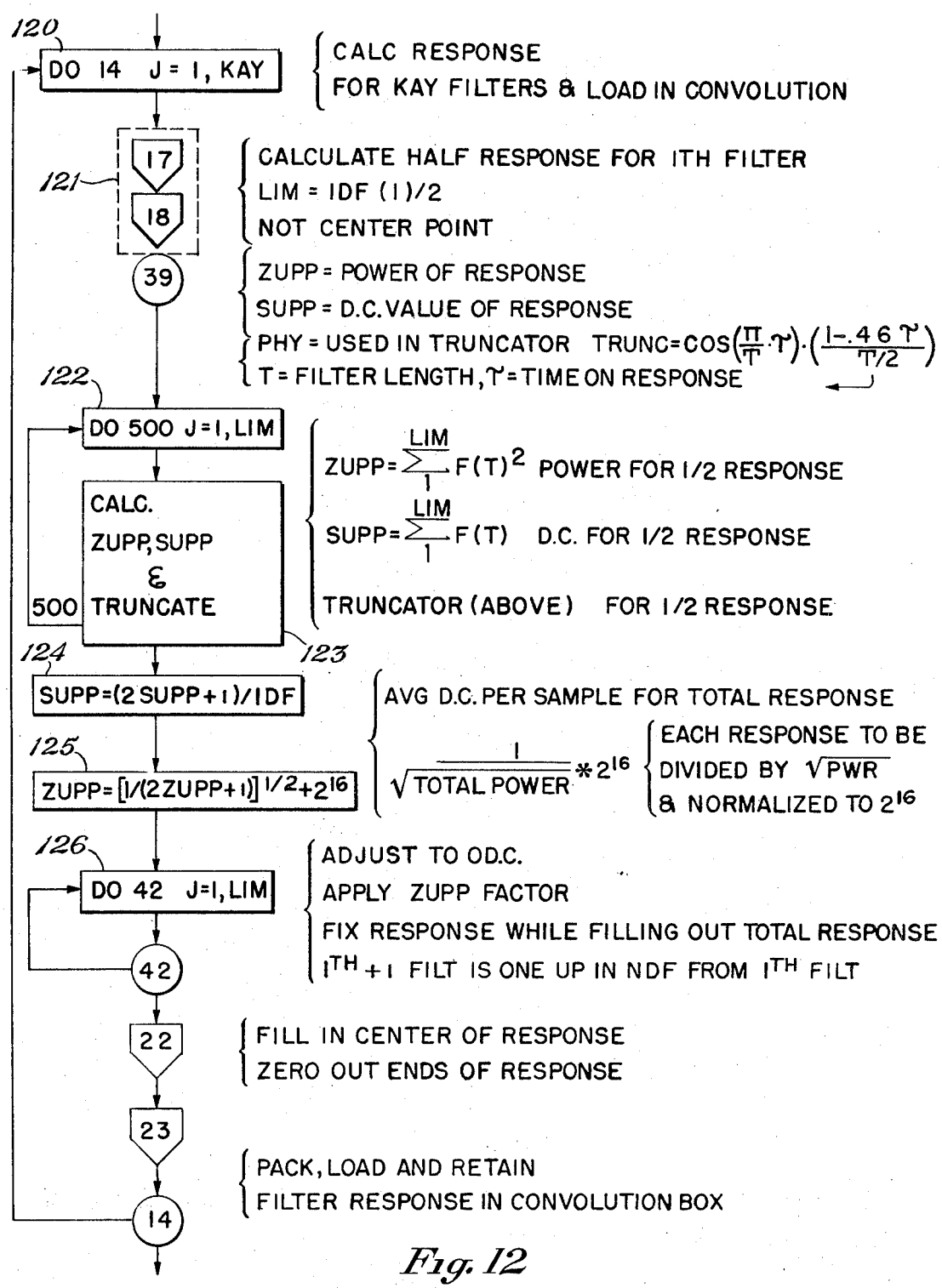

A flow diagram of the process is illustrated in FIGS. 11 and 12. This diagram refers to both statement numbers in the computer program and to note numbers which are set forth in parenthesis to the left of the computer program. In the rectangular boxes and the circles in the flow diagram, the numbers referred to are the statement numbers of the computer program. The numbers referred to in the flow diagram in the inverted house-shaped figures (i.e., 17, 18, 22, and 23) are the note numbers on the computer program. A description of the flow diagram and computer program will now be given.

The computer program is in Fortran language and it is adapted to be operated in a CDC 6600 General Purpose Digital Computer. The computer program is as follows:

```
(1)       PROGRAM Z1210(INPUT,OUTPUT,TAPE49)
          COMMON/A627/WB,IDEC,ICHAN,OP1,OP2,OP3,IEOPR,IEOPW,ISAMP,JRBUF(80),
         1LOC,NUMPRO
          COMMON//INFCA(13),RECA(12000),ITRQ(2000)
          DIMENSION FA(110),FB(110),FC(110),FD(110),T(110),FFA(80),FFB(80),
         1FFC(80),FFD(80),IT(80),IDF(80),WRKB(2152),TT(80),NDF(250)
         1,NUFIL(16),FRAY(160),NRKB(2152)
          TYPE INTEGER WRKB
          LABLE = 10HTOINP
          IEOPR=0 $ IEOPW=0 $ LOC=0 $ ISAMP=2
          CALL SIX27(1,0,0,0,0)
          CALL SIX27(6,0,0,0,LABLE)
          READ 300,IOFRI,IOLRI,IOFRO,MABLE,LENGTH,ISAMP,IFLAG
          NSAMP = LENGTH/ISAMP
          READ 319,(NUFIL(I),I = 1,16)
          IBEGIN = 2 $ IWIND = 202 $ ISTOP = NSAMP-150
          PRINT 301
          PRINT 317,IOFRI,IOLRI,IOFRO,MABLE,NSAMP,ISAMP,IFLAG
          PRINT 319,(NUFIL(I),I = 1,16)
          IF(IFLAG.EQ.0)IFLAG = 1
(2)       KFLAG = 9*IFLAG
          READ 302,(FA(I),FB(I),FC(I),FD(I),T(I),I=1,KFLAG)
          PRINT 303
          PRINT 304
          PRINT 305,(T(I),FA(I),FB(I),FC(I),FD(I),I=1,KFLAG)
          CALL XMITO(RECA,12000)
          IKI = 1 $ K = 1
        1 K = 1
(3)       DO 9 I = 1,9
          IT(K)= T(I)/ISAMP +.5
          TT(K)= T(I)
(4)       NFZ = .5*(FB(I)+FC(I))+.5
(5)       FCC = .25*(FD(I)+FC(I)-FB(I)-FA(I))
(6)       FFA(K)=FA(I) $ FFB(K)=FB(I) $ FFC(K)=FC(I) $ FFD(K)=FD(I)
(7)       IDF(K) = 2000./(FCC*ISAMP)+.5
        3 IF(IDF(K)/2*2.EQ.IDF(K)) IDF(K)=IDF(K)+1
          IF(IDF(K).GT.151)IDF(K) = 151
(8)       IF(I.EQ.9)GO TO 10
          IF(FB(I+1).EQ.0)GO TO 10
(9)       CDF = .25*(FD(I+1)+FC(I+1)-FB(I+1)-FA(I+1))
(10)      NNFZ = .5*(FB(I+1)+FC(I+1))+.5
(11)      NM = NFZ-NNFZ
          IF(NM.NE.0)GO TO 6
(12)      IF(FB(I).NE.FB(I+1))GO TO 2
          K = K+1
          GO TO 9
(13)    2 PFFUI = 1./FCC-1./CDF
          NM= (2000./ISAMP)*PFFUI+.5
          NM = IABS(NM)
(14)    6 AT = 1./NM
          AF= (FA(I)-FA(I+1))*AT
          BF = (FB(I)-FB(I+1))*AT
          CF = (FC(I)-FC(I+1))*AT
          DF= (FD(I)-FD(I+1))*AT
          DT= (T(I+1)-T(I))*AT
          CCF = (FCC-CDF)*AT
          NABS= IABS(NM) $ MJ= NABS+K-1 $ JJ= K+1 $ L= -NM/NABS
```

```
         IF(MJ.LT.JJ)4,5
      4  K = JJ  $ GO TO 9
(15)  5  DO 8 J= JJ,MJ
         LFZ = NFZ +L*(J-K)
         CFC = FCC+L*(J-K)*CCF
         FFA(J) = FFA(K)+L*(J-K)*AF
         FFB(J) = FFB(K)+L*(J-K)*BF
         FFC(J) = FFC(K)+L*(J-K)*CF
         FFD(J) = FFD(K)+L*(J-K)*DF
         TT(J) = T(I)-L*(J-K)*DT
         IT(J) = TT(J)/ISAMP +.5
         IDF(J) = 2000./(CFC*ISAMP)+.5
      7  IF(IDF(J)/2 *2.EQ.IDF(J)) IDF(J)= IDF(J) +1
         IF(IDF(J).GT.151)IDF(J) = 151
      8  CONTINUE
         K = MJ +1
      9  CONTINUE
(16) 10  MM = 1 $ KAY = K $ IT(1) = 1
         IF(KAY.GT.80)KAY = 80
         CONST = 0.
         KOUNT = 0
         PRINT 700
     700 FORMAT(* TIME     I      IDF       FZ         FC        F1       F
        12       F3      F4       POWER      AREA*)
(17)     DO 14 I=1,KAY
         NFPTS=IDF(I)$PI = 3.1415927
         F0 = FFA(I) $ F1 = FFB(I) $ F2 = FFC(I) $ F3 = FFD(I)
         DELT = FLOATF(ISAMP)/1000.  $ LIM =NFPTS/2
         CALL XMITO(FRAY,200)
         IF(F0-F1)37,33,37
     33  H=1./(F2-F1)
         PALPHA =2.*PI*F2*DELT
         PBETA =2.*PI* F1*DELT
         DO 36 K=1,LIM
     34  AK = K
         ALPHA = PALPHA*AK
         BETA = PBETA*AK
         IF(BETA.NE.0)GO TO 35
            FRAY(K) = H*(F2*SINF(ALPHA)/ALPHA)
         GO TO 36
     35     FRAY(K) = H*(F2*SINF(ALPHA)/ALPHA - F1*SINF(BETA)/BETA)
     36  CONTINUE
         GO TO 39
     37  PALPHA = PI*F3*DELT
         PBETA = PI*F2*DELT
         PGAMA = PI*F1*DELT
         PDELTA= PI*F0*DELT
         H = 1./(F3+F2-F1-F0 )
         DO 38 K= 1,LIM
         AK= K
         ALPHA =PALPHA*AK
         SALPHA = (SINF(ALPHA)/ALPHA)**2
         BETA = PBETA*AK
         SBETA = (SINF(BETA)/BETA)**2
         GAMA = PGAMA*AK
         SGAMA= (SINF(GAMA)/GAMA)**2
         DELTA= PDELTA*AK
         SDELTA =(SINF(DELTA)/DELTA)**2
     38    FRAY(K) = H*(F3**2/(F3-F2)*SALPHA-F2**2/(F3-F2)*SBETA-F1**2/(F
        1 1-F0)*SGAMA+F0**2/(F1-F0)*SDELTA)
(18) 39  PHY = 3.14159/(LIM*2.)
         ALIN = -.230/LIM
         ZUPP = SUPP = 0.
         DO 500 J = 1,LIM
         ANGLE = PHY*J
         FRAY(J) = FRAY(J)*COSF(ANGLE)*(ALIN*J+1.)
         SUPP = SUPP+FRAY(J)
```

```
(19) 500  ZUPP = ZUPP+FRAY(J)**2
          AREA = F3+F2-F1-F0
          AVG  = DELT*(2.*ZUPP+1.)*AREA
          CONST = CONST+AVG
          POWER = AVG*AREA
          KOUNT = KOUNT+IDF(I)
          FE = .25*(F3+F2-F1-F0) $ NFZ = .5*(F2+F1)+.5
          PRINT 701,TT(I),I,IDF(I),NFZ,FE,F0,F1,F2,F3,POWER,AREA
      701 FORMAT(F5.0,I5,2I10,F10.2,5X,4F7.2,2F10.4)
(20)      SUPP = (2.*SUPP+1.)/IDF(I)
          ZUPP = (1./(2.*ZUPP+1.)**.5)*65536.
          CALL XMITO(NDF,250)
(21)      DO 42 J = 1,LIM
          FRY = (FRAY(J)-SUPP)*ZUPP+.5
          NDF(LIM+J+1) = FRY
       42 NDF(LIM-J+1) = FRY
(22)      NDF(LIM+1) = (1.-SUPP)*ZUPP+.5
          NDF(I) = 0
          NDF(NFPTS+I-1) = 0
          KLM = IDF(I)
(23)      CALL PACK(NDF(I),NDF(I),KLM)
          ISTAT=0
          CALL SAPP(2000B,0,0,0,NDF(I),KLM,1,0,0,ISTAT,1,1,1)
       44 CALL XRCL
          IF(ISTAT.EQ.0)GO TO 44
       14 CONTINUE
```

Referring to FIG. 11, the input data is read and printed as illustrated at 100. In the computer program, the variables in the dimension statement include FA, FB, FC, and FD. These are the input filters arrays and correspond with the frequencies F1, F2, F3, and F4, as explained previously. T is the input time array. FFA, FFB, FFC, and FFD, are the output arrays of the set of interpolated filters which include the input filters and the interpolated filters. These variables for each filter corresponds with F1, F2, F3, and F4. IT is the start sample array. IDF is the filter length array. WRKB is a temporary trace array. TT is time corresponding to IT. NDF is the filter response integer array. NUFIL is the first record number in the new filter sequence array. FRAY is the filter response in floating point. NRKB receives the packed WRKB.

Still referring to the computer program at note number 2, IFLAG is the number of filter sets to be read in with a maximum of 12. Each set may have nine input filters. Not all nine filters need to be used. KFLAG is equal to the total number of input filters.

Referring again to FIG. 11, Loop 9 is illustrated as beginning at 101. In the computer program, Loop 9 is illustrated as beginning at note number 3. This loop determines the output set of interpolated filters from the input set. It determines IT, IDF, NFZ, FC and the frequencies FFA, FFB, FFC, and FFD for each of the filters of the output set of the interpolated filters.

Referring to the computer program, the center frequency for the Ith input filter is determined at note number 4, while the envelope frequency of the Ith input filter is determined at note number 5. At note number 6, the input values are placed in the output set defined by the K index. At note number 7, the filter length in samples is determined for the Ith input filter. At note number 8, control is transferred to statement number 10 out of the loop if the index of the input filter in question is equal to 9. In this instance, no more filters are to be interpolated.

At note number 9, the envelope frequency of the Ith+1 filter is determined while the center frequency of the Ith+1 filter is determined at note number 10.

The operations identified by note numbers 4–10 are illustrated in part as being done at 102 in FIG. 11.

At note number 11, the number of integer changes in center frequencies are determined between the Ith and the Ith+1 input filters. This is illustrated as being done at 103 in FIG. 11. This center frequency difference has been assigned the variable name NM.

In the flow diagram of FIG. 11, a decision is made at 104 to determine if the frequency difference NM is not equal to zero. If the frequency difference is not equal to zero, then control is transferred to statement 6 in the computer program. If the center frequencies of the Ith and the Ith+1 inputs are the same, then a determination is made at 105 as to whether the second frequencies of the Ith and the Ith+1 input filters are the same. These second frequencies are corner frequencies and correspond to F2 as explained previously. If the corner frequencies are different, then the difference in envelope frequencies between the Ith and the Ith+1 input filters are employed to obtain NM. This is illustrated at 106 in the flow diagram. Control then is transferred to statement 6 of the computer program. If the center frequencies are the same and the corner frequencies are the same, then the Ith and the Ith+1 input filters are taken to be equal. This is illustrated at 107 in the flow diagram. The filter number K then is incremented at 108 and control is transferred to statement 9 in order to go back into the loop.

Thus, if the center frequencies of the Ith and the Ith+1 input filters are the same, a check is made to determine whether the second corner frequencies are the same. If they are the same, then an assumption is made that the two filters are exactly alike and there will be no interpolation of filters between the two input filters under consideration. If the corner frequencies are different, however, the envelope frequency difference between the two input filters are employed to obtain the number of filters to be interpolated between the two input filters. This checking and decision making is done in the program beginning at note numbers 12 and 13.

At 110 in the flow diagram, the constants to be used in the interpolation loop DO8 are factored out whereby they may be multiplied by the appropriate terms outside of the loop DO 8 rather than inside this loop. In the computer program, the factoring to obtain the constants is done beginning at note number 14.

In the flow diagram, at 111 and 112, loop 8 from DO 8 to statement 8 carries out an interpolation to find the envelope frequency and FFA, FFB, FFC, FFD for each interpolated filter between the Ith and the Ith+1 input filters. Also determined in loop 8 are the start times and length of each interpolated filter between the Ith and Ith+1 input filters. These operations are carried out beginning at note number 15. At 111, in FIG. 11, a different variable is used to keep track of the K index.

At 113 in the flow diagram, control is transferred back to the beginning of the DO loop, DO 9, whereby the next input filter is picked and similar calculations and interpolations are carried out between the Ith and Ith+1 input filters.

The variable IT is the array used to specify the start times. At 114 in the flow diagram, the first input filter is set or adjusted to start filtering from the beginning of the record (sample number 1) down to its specified start time, and, in fact, slightly beyond to the trace sample prior to the start of the first interpolated filter. In addition, at 114 the number of filters K is set equal to KAY. In the program, the total number of filters for a given set has an upper limit of 80. In the computer program, these operations are carried out beginning at note number 16.

Loop 14 sequentially calculates or determines the time responses for the filters, truncates, DC removes, power normalizes, and normalizes to $2^{16}$. It also packs and loads the filters into a convolution box for carrying out filtering operations on the seismic traces. It begins at 120 in FIG. 12, and at note number 17 on the computer program. This note number is referred to in the dotted box 121 in the flow diagram. Initially, loop 14 calculates only one-half of the response of the Ith filter. (In loop 14, the index for the complete set of interpolated filters is I). The initial calculation does not include the center point. Subsequently, the response is flipped to determine the other half and the center point filled in. In loop 14, just prior to statement 33, a check is made to determine if the first two frequencies, of the filter being considered, are equal. If they are equal, the filter is designated a sinc filter and one-half the time response for that filter is calculated in loop 34. If the first two frequencies of the filter are not equal, the filter is designated a sinc-squared filter and one-half of its time response is calculated in loop 38. At note number 18, which corresponds to statement 39 of the computer program, constants PHY and ALIN are determined and which are to be used subsequently for determining the truncator. Also, variables ZUPP and SUPP are set to equal to zero. ZUPP is a variable name used for the energy normalization factor which is used on the time responses, while SUPP is a variable name used for DC correction of the time responses.

At DO loop, DO 500 indicated to begin at 122 in the flow diagram and extending through statement 500 indicated at 123, factors for truncation, power calculation, and DC calculation are determined from the previously calculated half response. These calculations are carried out in the computer program in loop 500 ending at note number 19.

At 124 in the flow diagram, the DC correction factor for the total response is calculated. At 125 in the flow diagram, the energy normalization factor for the total response is calculated and multiplied by $2^{16}$. These operations are done in the computer program beginning at note number 20. Multiplication by $2^{16}$ converts the data to a large number so that when it is converted to integer form by truncation for use in the convolution box, the truncated part is insignificant.

DO 42, beginning at 126, in the flow diagram, fills in the total response and DC corrects and normalizes. In addition, in the array NDF, where the time responses are stored, the starting address is indexed. In the computer program, these operations are done beginning with note number 21. At note number 22, in the computer program, the center of the response is filled in and the ends are zeroed out. At note number 23 of the computer program, the response is packed and loaded into the convolution box and control is returned to the beginning of DO 14 to determine the response of the next filter.

As the filters of the set are calculated, they are stored in the convolution box and kept there until that particular set of filters is calculated in full. Filtering is carried out by sending the records through one trace at a time. In the computer program disclosed, the number of filters per set has a maximum limit of 80. This limit may be varied, however. A different set of filters could be used for each record (which may comprise 24 traces) or a given set of filters may be used for a plurality of records. In the program as written, the number of times that the set of filters may be changed is twelve. For example, if 100 records are to be filtered, then only 12 different sets of filters may be calculated to operate on those 100 records. This limit also may be varied.

When a set of filters is operating on a given trace, the first input filter will start with the first sample and operate on the samples to the filter's assigned start time plus additional samples up to the start time of the first interpolated filter. At that point, the first interpolated filter will take over and operate to the start of the second interpolated filter. Filtering carries on in this manner until the last interpolated filter is reached. This last interpolated filter will operate to the start time of the last input filter. The last input filter, in turn, will operate from its start time to the end of the record.

This is illustrated in FIG. 5. In FIG. 5, the horizontal lines extending from the Fo and Fc curves indicate the time interval through which each filter is applied. For example, the first filter of the completed set (which is also the first input filter) is designated as K=1. The next filter is designated as K=2. It is the first interpolated filter. K=1 will be applied from the first of the record to the trace sample just prior to the start time of K=2. K=2 will be applied from its start time to the trace sample just prior to the start time of K=3. The next to last interpolated filter will be applied from its start time to the trace sample just prior to the start time of K=KAY, the last input filter. Input filter KAY will be applied from its start time to the end of the record.

A more thorough explanation now will be given on sinc filters and the manner in which equations (1) and (2) may be employed to define band-pass sinc and sinc squared filters. In addition, a more thorough explanation will be given on the use of the expression (5) to calculate each filter to the same percentage decay point. Low-pass sinc filters will be discussed first.

LOW PASS SINC FILTERS

The general equation for the time-response of any Low-Pass, (L.P.), sinc filter with a cutoff frequency of $f$ hertz is $$F(t) = 2f\text{SINC}2ft = 2f\text{SIN}2\pi ft/2\pi ft \quad (11)$$

The general graph of this function is shown in FIG. 13. The frequency response is shown in FIG. 14. Eq. (11) can be written as $$F(t) = \text{SIN}2\pi ft/\pi t \quad (12)$$

Thus, $F(t)$ can be thought of as a SINE wave of frequency $f$, symmetrical about $t=o$, and modulated by an envelope of $1/\pi t$. (The limit of $\text{SIN}x/x$ as $x \to o$ provides the zero value of $2f$ as seen in FIG. 15). As will be seen, the fact that the envelope, $1/\pi t$, is independent of frequency and is, therefore, the envelope of all L.P. sinc filters, begins to provide one with the means for gauging filter similarities. One may define the time at any point on an arbitrary L.P. sinc filter, (e.g., the $f^{th}$ filter) as $$t = Co\Delta T_f \quad (13)$$

Where $\Delta T_f = 1/2f$ and Co is any positive real number, (e.g. Co=1, 1.4, 3.85, etc.). This enables one to refer between L.P. sinc filters maintaining the same relative time position. FIG. 16 illustrates this procedure using arbitrary values for Co of 0.67 and 2.33. If one chooses integer values of Co, the end times of the various lobes are defined, (i.e., the zero crossings). For example, Co = 2.0 will refer to the end time of the second lobe. In FIG. 16, one can see that this would be 25 mils for the 40 Hz filter and 40 mils for the 25 Hz filter. Thus, Co may be thought of as "Lobe Number." If any of the following series of values for Co are used, (Co = 0.5, 1.5, 2.5, etc.), the intersection times of the filter and its $1/\pi t$ envelope are referred to. See FIG. 17. Since the time, ($t$), can be expressed in terms of Co and $\Delta T_f$ as above and the amplitude of the envelope at $t$ is given by $1/\pi t$, the envelope amplitude can be given as $$A = 1/\pi t = 1/\pi(Co\Delta T_f) \quad (14)$$

and since $\Delta T_f = 1/2f$ $$A = 2f/\pi Co$$

If Co is an integer multiple of 0.5, Eq. (14) can be used to obtain the amplitude of a filter's time response, since, as seen in FIG. 17, such values of Co will describe times of intersection between the filter response and its envelope. Remembering that $2f$ is the maximum amplitude of an L.P. sinc filter at frequency $f$ Hz, one can divide Eq. (14) by $2f$ and obtain $$R = A/2f = 1/\pi Co \quad (15)$$

This ratio, R, is the ratio of the envelope amplitude at "Lobe Number" Co to the maximum value of the filter's time response, ($2f$ at $t=o$). It is, thus, an expression which gives the percentage decay of a filter at a particular lobe number Co. While Eq. (15) is only strictly true when Co is a multiple of 0.5, it is, nevertheless, a valuable tool in describing the decay of an L.P. sinc filter. (Note that it is strictly a function of lobe number.) One can quite readily speak of the decay at the $3.4^{th}$ lobe, for example, using Eq. (15).

$$R(3.4) = 1/\pi(3.4) = 0.0935 \text{ or } 9.35\%$$

This is to say any L.P. sinc filter has decayed to 9.35 percent of its initial value at the $3.4^{th}$ lobe.

The above discussion provides one with a tool of consistency when describing any set of L. P. sinc filters. All that is required is that each filter be calculated to the described "Lobe number," Co. That is to say, if each filter is calculated to the same Co, one can be assured that each filter will have the same percentage decay. Each filter, however, may have a different length. This length calculation is arrived at in the following manner.

Let $t_c$ equal the desired filter length and amplitude of envelope equal $1/\pi T_c$. Remembering that R, (the ratio in Eq. 15,) is defined as $$R = \frac{\text{Envelope Amplitude at } t_c}{\text{Filter Amplitude at } t = 0} = 1/\pi Co \quad (16)$$

$$\frac{1/\pi t_c}{2f} = 1/\pi Co$$

And, therefore, $$t_c = Co/2f = \text{Desired filter length} \quad (17)$$

Eq. (17) may be written in terms of the decay ratio as $$t_c = 1/2\pi fR \quad (18)$$

Assume, for example, that a decay ratio of 10 percent was desired. One could solve for Co using Eq. (15).

$$R = 0.10 = 1/\pi Co$$

$$Co = 3.18$$

This means that regardless of what L.P. sinc filter is used, the $3.18^{th}$ lobe will have a 10 percent decay. This Co, (i.e., Co = 3.18), could be used in Eq. (17) to obtain the desired (required) filter length.

Thus, to avoid discontinuities when filtering a single seismic record with different L.P. sinc filters, one must insure that each filter is calculated to the same percentage decay point. In other words, Co is set and held constant for all the filters. Eq. (17) is then utilized to arrive at the required filter lengths. This equation corresponds with expression (5) mentioned previously.

Since R has been defined as the percentage decay of the filter response, 1−R may be viewed as a measure of the percentage of the ideal filter, (infinite length), one sees by stopping the calculation at the $Co^{th}$ lobe. FIG. 18 is a graph of 1−R vs. Co. The graph indicates the necessity of a minimum Co while indicating too, the folly of using too many lobes to obtain only insignificant decay increases. One can see from the graph that Co's on the order of two or three should suffice.

BAND PASS SINC FILTERS

On the surface, B. P. sinc filters do not lend themselves to a simple analysis as do the L.P. sinc filters. However, there is a relatively simple translation of thinking which enables one to view a symmetrical B.P.

filter in terms of its center frequency and its L.P. equivalent envelope. (See Fourier Integral and Its Applications, A. Popoulis, Chapter 7, 1962.) The derivation for B.P. sinc filters follows.

The time response for a B.P. sinc filter of high corner frequency f2 and low corner frequency f1 is obtained by finding the difference of the time responses for the L.P. sinc filters at $f2$ and $f1$. That is to say $$F(t)[B.P.] = F(t)[L.P. \text{ at } f2] - F(t)[L.P. \text{ at } f1]$$

Using Eq. (11), the expression for the time response of an L.P. sinc filter, the B.P. response becomes $$F(t) = [2f2 \text{SINC} 2f2t - 2f1 \text{SINC} 2f1t]$$
$$= g[\text{SIN} 2\pi f2t - \text{SIN} 2\pi f1 t]/\pi t$$

which is Equation (7), previously described.

For the sake of simplicity, let $$\alpha = 2\pi f2 t$$
$$\beta = 2\pi f1 t$$

and let $$fo = (\tfrac{1}{2})(f2 + f1) = (1/2\pi t)[(\alpha + \beta)/2] \quad (19)$$

$$fc = (\tfrac{1}{2})(f2 - f1) = (1/2\pi t)[(\alpha - \beta)/2] \quad (20)$$

It will be recalled that Eq. (1) is the same as the first part of Eq. (19).

The reasons for the $fo$ and $fc$ transformations will become clear in the following steps Using the following trigonometric identity $$\sin\alpha - \sin\beta = 2\sin[(\alpha - \beta)/2]\cos[(\alpha + \beta)/2]$$

and since $$F(t) = [\sin\alpha - \sin\beta]/\pi t$$

$F(t)$ becomes $$F(t) = [2\sin((\alpha - \beta)/2) \cdot \cos((\alpha + \beta)/2)]/\pi t$$

which, in turn, becomes $$F(t) = [2\sin 2\pi fct \cdot \cos 2\pi fot]/\pi t$$

Multiplying the right-hand side by $2fc/2fc$ $$F(t) = 2\cos 2\pi fot [2fc \sin 2\pi fct / 2\pi fct] \quad (21)$$

In other words, the time response for a B.P. sinc filter is shown to be a cosine wave at a frequency of $fo$ Hz and amplitude 2 modulated by a L.P. sinc filter at $fc$ Hz. Thus, a B.P. sinc filter has an L.P. sinc filter envelope.

FIG. 1 shows the relationship between the two sets of frequencies, $f2, f1$, and $fo, fc$. Remember that $$fo = (\tfrac{1}{2})(f2 + f1)$$

and $$fc = (\tfrac{1}{2})(f2 - f1)$$

One may, therefore, view the time response of a B.P. sinc filter as obtained by modulating a carrier signal, (cosine wave), at the filter's center frequency, $(fo)$, by an L.P. sinc filter with a cut-off frequency of half the B.P. filter's band-width, $(fc)$. FIG. 19A–19C show how this is done for a 30–60 Hz sinc filter.

Viewed as the difference of two sinc functions, a B.P. sinc filter is not easily analyzed, however, it readily lends itself to analysis in terms of its center frequency carrier and L.P. sinc envelope. Most important is that the amplitude of the B.P. time response is restricted to that of and L.P. sinc filter and thus can be handled in manner detailed above for L.P. sinc filters.

That is, to obtain consistent descriptions for a set of B.P. sinc filters, one needs merely to calculate the envelope frequency, $(fc)$ for each filter, decide how many lobes of the envelope are needed, (Co), keep this value constant and use Eq. (17) to calculate the proper filter length. The frequency to be used in Eq. (17) is the fc for each filter.

B.P. SINC-SQUARED FILTERS

The time response for a B.P. sinc-squared filter is even more involved than that of a B.P. sinc filter. However, if one makes one stipulation for the sinc-squared filter, an expression similar to Eq. (21) can be found for B.P. sinc-squared filters. The condition that one must make for the derivation is that the filter be fully symmetrical. That is to say $$f4 - f3 = f2 - f1$$

where $f1$ and $f4$ are the low and high cutoff frequencies respectively and $f2$ and $f3$ are the low and high corner frequencies respectively, for example, a 15–20–60–65 filter rather than a 14–20–60–64 filter.

Most filters actually used in seismic work do not have this full symmetry. However, if one would adjust the cutoff frequencies just enough to provide the symmetry, one would find virtually no difference in the time responses. The reason for this will become apparent below. The algorithm under discussion treats all sinc-squared filters as if they were fully symmetrical.

The usual expression for sinc-squared B.P. time response is $$F(t) = h \left[ \frac{f4^2 \text{ SINC}^2 f4t - f3^2 \text{ SINC}^2 f3t}{f4 - f3} - \frac{f2^2 \text{ SINC}^2 f2t - f1^2 \text{ SINC}^2 f1t}{f2 - f1} \right]$$

where $h = [f4 + f3 - f2 - f1]^{-1}$

The above equation is Equation (8) previously described. Equation (8) can be simplified to the following $$F(t) = \cos 2\pi fot \cdot \text{SINC} 2fct \cdot \text{SINC} fut \quad (22)$$

The notations for the various frequencies are clarified by FIG. 2.

Frequencies $fc$ and $fu$ are defined as follows $$fc = (fc1 + fc2/2) = \text{Avg. half band-width}$$

$$fu = [(f4 - f3) + (f2 - f1)/2] = f4 - f3 = f2 - f1$$

The envelope frequency, $(fc)$, for sinc B. P. filters, (Eq. 20) can now be adjusted to Equation (2) described previously.

$$fc = (f4 + f3 - f2 - f1)/4 \text{ Avg. half band-width}$$

NOTE: This reduces to the original Eq. 20 when $$f4 = f3 \text{ and } f1 = f2$$

The expression for the center frequency remains the same (Eqs. 1 and 19).

$$fo = (\tfrac{1}{2})(f2 + f3) \text{ Center frequency}$$

The similarity between Eq. (21) and Eq. (22) is readily apparent. The first factor gives the carrier signal at $fo$ hertz. The second factor is the L.P. sinc envelope at a frequency $fc$ which is equal to the average half-band width of the filter.

$fc$ in Eq. (20) above can be viewed as the $fc$ obtained for just a sinc filter, (i.e., $fc = (½)(f3-f2)$, plus an additional term $fu/2$. Since $fu$ is normally small, (usually around 5 hertz), the L.P. sinc envelope for a sinc-squared filter is only slightly different than that of the sinc filter. In any event, the effect of the additional $fu/2$ term is to cause the envelope for the sinc-squared filter to both oscillate and decay more rapidly than the envelope for a sinc filter.

The third factor in Eq. (22), SINC2$fu/2t$, is lacking in Eq. (21). It is also a sinc function but at a very low frequency, $fu/2$. Since the frequency of a L.P. sinc function is inversely proportional to its period, the period of the third factor is long enough for that factor to be termed a truncator.

One can, therefore, picture a sinc-squared B. P. filter as a COSINE wave at the center frequency of the filter, $fo$, modulated by an L.P. sinc filter at its average half band-width, ($fc = (f3-f2)/2 + fu/2$), and truncated by another L.P. sinc function at a frequency of $fu/2$ hertz.

As $f4$ approaches $f3$ and $f1$ approaches $f2$, (i.e., as $fu$ → 0), $fc$ becomes the half band-width for a sinc filter with corner frequencies $f2$ and $f3$, (i.e., $fc = (½)(f3-f2)$), and since the limit of SIN$x/x$ as $x$ approaches 0, i.e., $fu/2$ approaches 0), is 1, the third factor in Eq. (22) becomes 1 and Eq. (22) smoothly grades into Eq. (21). Actually Eq. (22) is normalized by twice the area of the filter so that to fully equate the two equations, one must multiply Ea. (22) by (2)·(Area) or $4fc$.

Thus, B.P. sinc and sinc-squared filters both may be defined predominately as a cosine wave at the center frequency of the filter modulated by an L.P. sinc filter. In addition, since a great deal of consistency is obtained from filter to filter when one adheres to a constant number of lobes on the envelope one may obtain consistent descriptions of B.P. sinc and sinc-squared filters. In addition, since the B.P. sinc filter may be viewed as a degenerate sinc-squared filter one may trade back and forth between B.P. sinc and sinc-squared filters.

Suppose, for example, one wanted to use a set of filters generated between two input filters, a 26–62 hertz B.P. sinc filter and a 16–20–40–44 hertz B.P. sinc-squared filter. (Note the band-width ratios are different in each case and are 2.38 and 2.0 respectively.)

Using Eq. (2)

$$fc1 = 0.25(62+62-26-26) = 18 \text{ hertz}$$

$$fc2 = 0.25(44+40-20-16) = 12 \text{ hertz}$$

Using Eq. (17) and Co=3.0 (i.e., 3 lobes of 5 envelope)

$$t1 = 3/(2)(18) = 83.3 \text{ mils}$$

$$t2 = 3/(2)(12) = 125.0 \text{ mils}$$

actually, these times represent half the total filter lengths needed. (They are symmetrical about $t=o$). A filter length of 167 mils for a 26–62 sinc filter is, therefore, consistent with a length of 250 mils for a 16–20/40–44 filter. For the intermediate filters (and for any others for that matter) a length consistent with the above lengths is given by $$t = (2)(3)/(2)(fc) = 3/(0.25(f4+f3-f2-f1))$$

$$= 12/(f4+f3-f2-f1)$$

For example, for a 30–42 42 sinc filter $$t = 12/24 \text{ seconds } 500 \text{ mils}$$

should one wish to obtain a more complete (longer) filter one needs to increase Co, and conversely if less accuracy is needed or desired, Co becomes smaller. For any consistent look, however, Co should remain constant.

Although a smoothly varying set of filters is characterized by a slowly varying envelope, the center frequency changes several times more rapidly, so that while several adjacent filters, (interpolated between the input filters), may be said to have the same envelope, their center frequencies will be different. This is illustrated as follows:

A normal spread of filters for a seismic record might call for a 30–70 sinc at 0 record time to a 10–30 sinc at 4 seconds.

The center frequencies for these two filters are $$fo1 = (½)(f2+f3) = (½)(30+70) = 50 \text{ hertz}$$

$$fo2 = (½)(10+30) = 20 \text{ hertz}$$

The envelope, (avg. half bandwidth), frequencies are $$fc1 = (¼)(70+70-30-30) = 20 \text{ hertz}$$

$$fc2 = (¼)(30+30-10-10) = 10 \text{ hertz}$$

The center frequency changes through 30 hertz while the envelope frequency changes through 10 hertz or $$\Delta fo = 3\Delta fc$$

With a different run, one might have a 25–50 hertz filter at 0 time graded down to a 10–25 hertz filter $$\Delta fo = (½)(25+50) - (½)(10+25) = 20 \text{ hertz}$$

$$\Delta fc = (¼)(50+50-25-25) - (¼)(25-25-10-10)$$

$$= 5 \text{ hertz}$$

or $$\Delta fo = 4\Delta fc$$

Thus, since the center frequencies change more rapidly than the envelope frequencies it was felt that interpolation based upon the change in center frequencies would insure greater similarity between the filters.

The actual rate at which it was decided to interpolate filters between any two input filters was dictated by experience. A filter change at every hertz change in $fo$ was judged to be sufficient. For example, a change every one-half hertz may not improve the results sufficiently to warrant doubling the number of interpolated filters. A change every 3 hertz, however, may not be sufficient to obtain the desired similarity.

What is claimed is:

1. A method of forming a set of time-variant filters from an input set of filters having predetermined start times, for operating on a time series of seismic data, said method being carried out in an automatic computing system, comprising the steps of:

determining the center frequency and envelope frequency of adjacent input filters of said input set, determining a number of filters to be interpolated between adjacent input filters, determining the envelope frequencies of the interpolated filters between adjacent input filters, and determining the length of the input filters and interpolated filters as inversely proportional to their envelope frequencies.

2. A method of forming a set of time-variant filters from an input set of filters having predetermined start times, for operating on a time series of seismic data, said method being carried out in an automatic computing system, comprising the steps of:
determining the center frequency and envelope frequency of adjacent input filters of said input set,
determining the center frequency difference between adjacent input filters,
determining a number of filters to be interpolated between adjacent input filters as a function of the difference in center frequencies between adjacent input filters,
determining the start times and the envelope frequencies of the interpolated filters, and
determining the length of the input filters and interpolated filters as inversely proportional to their envelope frequencies.

3. The method of claim 2, comprising the step of:
setting the number of filters to be interpolated between adjacent input filters as equal to the number of integer frequency changes between adjacent input filters minus one.

4. The method of claim 2, comprising the steps of:
determining the envelope frequencies of the interpolated filters between adjacent input filters by a linear interpolation between the envelope frequencies of adjacent input filters, and
determining the start times of the interpolated filters between adjacent input sets by placing the interpolated filters at equally spaced time intervals between adjacent input filters.

5. The method of claim 4, comprising the step of:
setting the number of filters to be interpolated between adjacent input filters as equal to the number of integer frequency changes between adjacent input filters minus one.

6. A method of forming a set of time-variant filters from an input set of filters having predetermined start times, for operating on a time series of seismic data, said method being carried out in an automatic computing system, comprising the steps of:
determining the center frequency NFZ and envelope frequency FC for the Ith and Ith+1 input filters of said input set,
determining a number of filters N to be interpolated between the Ith and Ith+1 inputs in the following manner:

$$N = NFZ(I) - NFZ(I+1) - 1$$

where $NFZ(I)$ is the center frequency of the Ith filter and $NFZ(I+1)$ is the center frequency of the Ith+1 filter, linearly interpolating envelope frequency values FC, N times between FC(I) and FC(I+1),
where $FC(I)$ is the envelope frequency of the Ith filter and $FC(I+1)$ is the envelope frequency of the Ith+1 filter,
placing said number N of interpolated filters $[T(I+1)-T(I)](N+1)$ mils apart in time, between the Ith and Ith+1 inputs,
where $T(I)$ is the start time of the Ith input and $T(I+1)$ is the start time of the Ith+1 input,
determining the length of the input filters and interpolated filters as inversely proportional to their envelope frequencies FC,
calculating the time responses of each of said filters to their respective lengths, and
truncating the time responses with a truncator having the same length as said time responses and defined in the following manner:

$$\cos[(\pi at)/T] \cdot [1-(0.46t)/T]$$

where T is the filter length in time and $t$ is the time from the center of each filter.

7. The method of claim 6, comprising the step of normalizing the truncated time response of each filter by dividing each sample of the truncated time response by the square root of the sum of the squared values of each sample.

8. The method of claim 6, wherein the length of each filter is determined by use of the following relationship:

$$K/FC$$

where K is a constant.

9. A method of forming a set of time-variant filters from an input set of filters having predetermined start times, for operating on a time series of seismic data, said method being carried out in an automatic computing system, comprising the steps of:
determining the center frequency and envelope frequency of adjacent input filters of said input set,
determining the center frequency difference between adjacent input filters,
filling in intermediate filters between adjacent input filters,
determining the number of intermediate filters to be filled in between adjacent input filters as a function of the difference in center frequencies between adjacent input filters,
determining the start times and the envelope frequencies of the intermediate filters, and
determining the length of the input filters and intermediate filters in accordance with the relationship, K/FC, where K is a constant, and FC is the envelope frequency of the corresponding filters.

* * * * *

UNITED STATES PATENT OFFICE
CERTIFICATE OF CORRECTION

Patent No. 3,701,091        Dated October 24, 1972

Inventor(s) Jeremiah P. Lenihan

It is certified that error appears in the above-identified patent and that said Letters Patent are hereby corrected as shown below:

In the Title page, second column, under "Attorney", add --Andrew L. Gaboriault and Sidney A. Johnson--.

Column 2, line 1, that portion of the formula reading "(9.46t)" should read -- (0.46t) --.
Column 4, line 27, after "between" insert --inputs--.
Column 5, formula (4), that portion of the formula reading "(N+b1)" should read -- (N+1) --.
Column 6, line 30 (Formula 7), that portion of the formula reading "F(t)=[2f2SINC2f2t" should read -- F(t)=g[2f2SINC2f2t --.
Column 8, line 1, that portion of the formula reading "($\pi$bit)" should read -- ($\pi$t) --.
Column 18, formula (16), that portion of the formula reading $$\frac{1/\pi tc}{2f}$$ should read $$\frac{1/\pi t_c}{2f}$$

Column 19, line 14, that portion of the formula reading "F(t)=[2f2SINC2f2t" should read -- F(t)=g[2f2SINC2f2t --.
Column 20, line 1, "and" (first occurrence) should read --an--.
Column 21, line 32, "Ea.(22)" should read --Eq.(22)--; and
line 67, that portion of the formula reading "(0.25(f4+3-f2-f1))" should read -- (0.25(f4+f3-f2-f1)) --.
Column 22, line 1, "30—42 42" should read -- 30—42 --.
Column 24, line 7 (Claim 6), "-T(I)](N+1)" should read -- -T(I)]/(N+1) --; and
line 20, that portion of the formula reading "($\pi$at)" should read -- ($\pi$t) --.

Signed and sealed this 3rd day of April 1973.

(SEAL)
Attest:

EDWARD M. FLETCHER, JR.         ROBERT GOTTSCHALK
Attesting Officer               Commissioner of Patents